United States Patent
Jaffari et al.

(10) Patent No.: US 9,489,897 B2
(45) Date of Patent: *Nov. 8, 2016

(54) SYSTEM AND METHODS FOR THERMAL COMPENSATION IN AMOLED DISPLAYS

(71) Applicant: Ignis Innovation Inc., Waterloo (CA)

(72) Inventors: Javid Jaffari, Kitchener (CA);
Gholamreza Chaji, Waterloo (CA);
Tong Liu, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 163 days.

This patent is subject to a terminal disclaimer.

(21) Appl. No.: 14/481,520

(22) Filed: Sep. 9, 2014

(65) Prior Publication Data

US 2014/0375623 A1  Dec. 25, 2014

Related U.S. Application Data

(63) Continuation of application No. 12/958,655, filed on Dec. 2, 2010, now Pat. No. 8,907,991.

(51) Int. Cl.

| G09G 3/3291 | (2016.01) |
|---|---|
| G09G 3/32 | (2016.01) |
| G06F 17/50 | (2006.01) |

(52) U.S. Cl.
CPC ......... *G09G 3/3291* (2013.01); *G06F 17/5018* (2013.01); *G09G 3/3233* (2013.01); *G06F 2217/80* (2013.01); *G09G 2300/0819* (2013.01); *G09G 2310/0289* (2013.01); *G09G 2320/029* (2013.01); *G09G 2320/0233* (2013.01);

(Continued)

(58) Field of Classification Search
CPC .......... G06F 17/5018; G06F 2217/80; G09G 2300/0819; G09G 2310/0289
See application file for complete search history.

(56) References Cited

U.S. PATENT DOCUMENTS

| 3,506,851 A | 4/1970 | Polkinghorn et al. |
|---|---|---|
| 3,774,055 A | 11/1973 | Bapat et al. |

(Continued)

FOREIGN PATENT DOCUMENTS

| CA | 1 294 034 | 1/1992 |
|---|---|---|
| CA | 2 109 951 | 11/1992 |

(Continued)

OTHER PUBLICATIONS

Ahnood et al.: "Effect of threshold voltage instability on field effect mobility in thin film transistors deduced from constant current measurements"; dated Aug. 2009.

(Continued)

*Primary Examiner* — Andrew Sasinowski
*Assistant Examiner* — Chun-Nan Lin
(74) *Attorney, Agent, or Firm* — Nixon Peabody LLP

(57) ABSTRACT

Disclosed is a circuit and technique to determine the temperature of an AMOLED display in order to calibrate programming data signals. The temperature of selected pixels of a plurality of pixels in an AMOLED display is measured via one of several disclosed methods. A thermal sensor for the selected pixels may be used. A measurement of output voltage data may be used to estimate temperature. A finite element analysis model may be used based on consumed power of the selected pixel. The temperature data for the selected pixel is then interpolated to the neighboring non-selected pixels to estimate the temperature of those pixels.

31 Claims, 5 Drawing Sheets

(52) U.S. Cl.
CPC    *G09G2320/0271* (2013.01); *G09G 2320/041* (2013.01); *G09G 2320/0693* (2013.01)

(56) References Cited

U.S. PATENT DOCUMENTS

| | | | |
|---|---|---|---|
| 4,090,096 A | 5/1978 | Nagami |
| 4,160,934 A | 7/1979 | Kirsch |
| 4,354,162 A | 10/1982 | Wright |
| 4,943,956 A | 7/1990 | Noro |
| 4,996,523 A | 2/1991 | Bell et al. |
| 5,153,420 A | 10/1992 | Hack et al. |
| 5,198,803 A | 3/1993 | Shie et al. |
| 5,204,661 A | 4/1993 | Hack et al. |
| 5,266,515 A | 11/1993 | Robb et al. |
| 5,489,918 A | 2/1996 | Mosier |
| 5,498,880 A | 3/1996 | Lee et al. |
| 5,557,342 A | 9/1996 | Eto et al. |
| 5,572,444 A | 11/1996 | Lentz et al. |
| 5,589,847 A | 12/1996 | Lewis |
| 5,619,033 A | 4/1997 | Weisfield |
| 5,648,276 A | 7/1997 | Hara et al. |
| 5,670,973 A | 9/1997 | Bassetti et al. |
| 5,684,365 A | 11/1997 | Tang |
| 5,691,783 A | 11/1997 | Numao et al. |
| 5,714,968 A | 2/1998 | Ikeda |
| 5,723,950 A | 3/1998 | Wei et al. |
| 5,744,824 A | 4/1998 | Kousai et al. |
| 5,745,660 A | 4/1998 | Kolpatzik et al. |
| 5,748,160 A | 5/1998 | Shieh et al. |
| 5,815,303 A | 9/1998 | Berlin |
| 5,870,071 A | 2/1999 | Kawahata |
| 5,874,803 A | 2/1999 | Garbuzov et al. |
| 5,880,582 A | 3/1999 | Sawada |
| 5,903,248 A | 5/1999 | Irwin |
| 5,917,280 A | 6/1999 | Burrows et al. |
| 5,923,794 A | 7/1999 | McGrath et al. |
| 5,945,972 A | 8/1999 | Okumura et al. |
| 5,949,398 A | 9/1999 | Kim |
| 5,952,789 A | 9/1999 | Stewart et al. |
| 5,952,991 A | 9/1999 | Akiyama |
| 5,982,104 A | 11/1999 | Sasaki et al. |
| 5,990,629 A | 11/1999 | Yamada et al. |
| 6,023,259 A | 2/2000 | Howard et al. |
| 6,069,365 A | 5/2000 | Chow et al. |
| 6,091,203 A | 7/2000 | Kawashima et al. |
| 6,097,360 A | 8/2000 | Holloman |
| 6,144,222 A | 11/2000 | Ho |
| 6,177,915 B1 | 1/2001 | Beeteson et al. |
| 6,229,506 B1 | 5/2001 | Dawson et al. |
| 6,229,508 B1 | 5/2001 | Kane |
| 6,246,180 B1 | 6/2001 | Nishigaki |
| 6,252,248 B1 | 6/2001 | Sano et al. |
| 6,259,424 B1 | 7/2001 | Kurogane |
| 6,262,589 B1 | 7/2001 | Tamukai |
| 6,271,825 B1 | 8/2001 | Greene et al. |
| 6,288,696 B1 | 9/2001 | Holloman |
| 6,304,039 B1 | 10/2001 | Appelberg et al. |
| 6,307,322 B1 | 10/2001 | Dawson et al. |
| 6,310,962 B1 | 10/2001 | Chung et al. |
| 6,320,325 B1 | 11/2001 | Cok et al. |
| 6,323,631 B1 | 11/2001 | Juang |
| 6,356,029 B1 | 3/2002 | Hunter |
| 6,373,454 B1 | 4/2002 | Knapp et al. |
| 6,392,617 B1 | 5/2002 | Gleason |
| 6,414,661 B1 | 7/2002 | Shen et al. |
| 6,417,825 B1 | 7/2002 | Stewart et al. |
| 6,433,488 B1 | 8/2002 | Bu |
| 6,437,106 B1 | 8/2002 | Stoner et al. |
| 6,445,369 B1 | 9/2002 | Yang et al. |
| 6,475,845 B2 | 11/2002 | Kimura |
| 6,501,098 B2 | 12/2002 | Yamazaki |
| 6,501,466 B1 | 12/2002 | Yamagishi et al. |
| 6,518,962 B2 | 2/2003 | Kimura et al. |
| 6,522,315 B2 | 2/2003 | Ozawa et al. |
| 6,525,683 B1 | 2/2003 | Gu |
| 6,531,827 B2 | 3/2003 | Kawashima |
| 6,542,138 B1 | 4/2003 | Shannon et al. |
| 6,555,420 B1 | 4/2003 | Yamazaki |
| 6,580,408 B1 | 6/2003 | Bae et al. |
| 6,580,657 B2 | 6/2003 | Sanford et al. |
| 6,583,398 B2 | 6/2003 | Harkin |
| 6,583,775 B1 | 6/2003 | Sekiya et al. |
| 6,594,606 B2 | 7/2003 | Everitt |
| 6,618,030 B2 | 9/2003 | Kane et al. |
| 6,639,244 B1 | 10/2003 | Yamazaki et al. |
| 6,668,645 B1 | 12/2003 | Gilmour et al. |
| 6,677,713 B1 | 1/2004 | Sung |
| 6,680,580 B1 | 1/2004 | Sung |
| 6,687,266 B1 | 2/2004 | Ma et al. |
| 6,690,000 B1 | 2/2004 | Muramatsu et al. |
| 6,690,344 B1 | 2/2004 | Takeuchi et al. |
| 6,693,388 B2 | 2/2004 | Oomura |
| 6,693,610 B2 | 2/2004 | Shannon et al. |
| 6,697,057 B2 | 2/2004 | Koyama et al. |
| 6,720,942 B2 | 4/2004 | Lee et al. |
| 6,724,151 B2 | 4/2004 | Yoo |
| 6,734,636 B2 | 5/2004 | Sanford et al. |
| 6,738,034 B2 | 5/2004 | Kaneko et al. |
| 6,738,035 B1 | 5/2004 | Fan |
| 6,753,655 B2 | 6/2004 | Shih et al. |
| 6,753,834 B2 | 6/2004 | Mikami et al. |
| 6,756,741 B2 | 6/2004 | Li |
| 6,756,952 B1 | 6/2004 | Decaux et al. |
| 6,771,028 B1 | 8/2004 | Winters |
| 6,777,712 B2 | 8/2004 | Sanford et al. |
| 6,777,888 B2 | 8/2004 | Kondo |
| 6,781,567 B2 | 8/2004 | Kimura |
| 6,806,497 B2 | 10/2004 | Jo |
| 6,806,638 B2 | 10/2004 | Lin et al. |
| 6,806,857 B2 | 10/2004 | Sempel et al. |
| 6,809,706 B2 | 10/2004 | Shimoda |
| 6,815,975 B2 | 11/2004 | Nara et al. |
| 6,828,950 B2 | 12/2004 | Koyama |
| 6,853,371 B2 | 2/2005 | Miyajima et al. |
| 6,859,193 B1 | 2/2005 | Yumoto |
| 6,873,117 B2 | 3/2005 | Ishizuka |
| 6,876,346 B2 | 4/2005 | Anzai et al. |
| 6,885,356 B2 | 4/2005 | Hashimoto |
| 6,900,485 B2 | 5/2005 | Lee |
| 6,903,734 B2 | 6/2005 | Eu |
| 6,909,243 B2 | 6/2005 | Inukai |
| 6,909,419 B2 | 6/2005 | Zavracky et al. |
| 6,911,960 B1 | 6/2005 | Yokoyama |
| 6,911,964 B2 | 6/2005 | Lee et al. |
| 6,914,448 B2 | 7/2005 | Jinno |
| 6,919,871 B2 | 7/2005 | Kwon |
| 6,924,602 B2 | 8/2005 | Komiya |
| 6,937,215 B2 | 8/2005 | Lo |
| 6,937,220 B2 | 8/2005 | Kitaura et al. |
| 6,940,214 B1 | 9/2005 | Komiya et al. |
| 6,943,500 B2 | 9/2005 | LeChevalier |
| 6,947,022 B2 | 9/2005 | McCartney |
| 6,954,194 B2 | 10/2005 | Matsumoto et al. |
| 6,956,547 B2 | 10/2005 | Bae et al. |
| 6,975,142 B2 | 12/2005 | Azami et al. |
| 6,975,332 B2 | 12/2005 | Arnold et al. |
| 6,995,510 B2 | 2/2006 | Murakami et al. |
| 6,995,519 B2 | 2/2006 | Arnold et al. |
| 7,023,408 B2 | 4/2006 | Chen et al. |
| 7,027,015 B2 | 4/2006 | Booth, Jr. et al. |
| 7,027,078 B2 | 4/2006 | Reihl |
| 7,034,793 B2 | 4/2006 | Sekiya et al. |
| 7,038,392 B2 | 5/2006 | Libsch et al. |
| 7,057,359 B2 | 6/2006 | Hung et al. |
| 7,061,451 B2 | 6/2006 | Kimura |
| 7,064,733 B2 | 6/2006 | Cok et al. |
| 7,071,932 B2 | 7/2006 | Libsch et al. |
| 7,088,051 B1 | 8/2006 | Cok |
| 7,088,052 B2 | 8/2006 | Kimura |
| 7,102,378 B2 | 9/2006 | Kuo et al. |
| 7,106,285 B2 | 9/2006 | Naugler |
| 7,112,820 B2 | 9/2006 | Change et al. |
| 7,116,058 B2 | 10/2006 | Lo et al. |
| 7,119,493 B2 | 10/2006 | Fryer et al. |

(56) References Cited

U.S. PATENT DOCUMENTS

| | | |
|---|---|---|
| 7,122,835 B1 | 10/2006 | Ikeda et al. |
| 7,127,380 B1 | 10/2006 | Iverson et al. |
| 7,129,914 B2 | 10/2006 | Knapp et al. |
| 7,164,417 B2 | 1/2007 | Cok |
| 7,193,589 B2 | 3/2007 | Yoshida et al. |
| 7,224,332 B2 | 5/2007 | Cok |
| 7,227,519 B1 | 6/2007 | Kawase et al. |
| 7,245,277 B2 | 7/2007 | Ishizuka |
| 7,248,236 B2 | 7/2007 | Nathan et al. |
| 7,262,753 B2 | 8/2007 | Tanghe et al. |
| 7,274,363 B2 | 9/2007 | Ishizuka et al. |
| 7,310,092 B2 | 12/2007 | Imamura |
| 7,315,295 B2 | 1/2008 | Kimura |
| 7,321,348 B2 | 1/2008 | Cok et al. |
| 7,339,560 B2 | 3/2008 | Sun |
| 7,355,574 B1 | 4/2008 | Leon et al. |
| 7,358,941 B2 | 4/2008 | Ono et al. |
| 7,368,868 B2 | 5/2008 | Sakamoto |
| 7,411,571 B2 | 8/2008 | Huh |
| 7,414,600 B2 | 8/2008 | Nathan et al. |
| 7,423,617 B2 | 9/2008 | Giraldo et al. |
| 7,474,285 B2 | 1/2009 | Kimura |
| 7,502,000 B2 | 3/2009 | Yuki et al. |
| 7,528,812 B2 | 5/2009 | Tsuge et al. |
| 7,535,449 B2 | 5/2009 | Miyazawa |
| 7,554,512 B2 | 6/2009 | Steer |
| 7,569,849 B2 | 8/2009 | Nathan et al. |
| 7,576,718 B2 | 8/2009 | Miyazawa |
| 7,580,012 B2 | 8/2009 | Kim et al. |
| 7,589,707 B2 | 9/2009 | Chou |
| 7,609,239 B2 | 10/2009 | Chang |
| 7,619,594 B2 | 11/2009 | Hu |
| 7,619,597 B2 | 11/2009 | Nathan et al. |
| 7,633,470 B2 | 12/2009 | Kane |
| 7,656,370 B2 | 2/2010 | Schneider et al. |
| 7,800,558 B2 | 9/2010 | Routley et al. |
| 7,847,764 B2 | 12/2010 | Cok et al. |
| 7,859,492 B2 | 12/2010 | Kohno |
| 7,868,859 B2 | 1/2011 | Tomida et al. |
| 7,876,294 B2 | 1/2011 | Sasaki et al. |
| 7,924,249 B2 | 4/2011 | Nathan et al. |
| 7,932,883 B2 | 4/2011 | Klompenhouwer et al. |
| 7,969,390 B2 | 6/2011 | Yoshida |
| 7,978,187 B2 | 7/2011 | Nathan et al. |
| 7,994,712 B2 | 8/2011 | Sung et al. |
| 8,026,876 B2 | 9/2011 | Nathan et al. |
| 8,049,420 B2 | 11/2011 | Tamura et al. |
| 8,077,123 B2 | 12/2011 | Naugler, Jr. |
| 8,115,707 B2 | 2/2012 | Nathan et al. |
| 8,208,084 B2 | 6/2012 | Lin |
| 8,223,177 B2 | 7/2012 | Nathan et al. |
| 8,232,939 B2 | 7/2012 | Nathan et al. |
| 8,259,044 B2 | 9/2012 | Nathan et al. |
| 8,264,431 B2 | 9/2012 | Bulovic et al. |
| 8,279,143 B2 | 10/2012 | Nathan et al. |
| 8,339,386 B2 | 12/2012 | Leon et al. |
| 8,493,296 B2 | 7/2013 | Ogawa |
| 2001/0002703 A1 | 6/2001 | Koyama |
| 2001/0009283 A1 | 7/2001 | Arao et al. |
| 2001/0024181 A1 | 9/2001 | Kubota |
| 2001/0024186 A1 | 9/2001 | Kane et al. |
| 2001/0026257 A1 | 10/2001 | Kimura |
| 2001/0030323 A1 | 10/2001 | Ikeda |
| 2001/0035863 A1 | 11/2001 | Kimura |
| 2001/0040541 A1 | 11/2001 | Yoneda et al. |
| 2001/0043173 A1 | 11/2001 | Troutman |
| 2001/0045929 A1 | 11/2001 | Prache |
| 2001/0052606 A1 | 12/2001 | Sempel et al. |
| 2001/0052940 A1 | 12/2001 | Hagihara et al. |
| 2002/0000576 A1 | 1/2002 | Inukai |
| 2002/0011796 A1 | 1/2002 | Koyama |
| 2002/0011799 A1 | 1/2002 | Kimura |
| 2002/0012057 A1 | 1/2002 | Kimura |
| 2002/0014851 A1 | 2/2002 | Tai et al. |
| 2002/0018034 A1 | 2/2002 | Ohki et al. |
| 2002/0030190 A1 | 3/2002 | Ohtani et al. |
| 2002/0047565 A1 | 4/2002 | Nara et al. |
| 2002/0052086 A1 | 5/2002 | Maeda |
| 2002/0067134 A1 | 6/2002 | Kawashima |
| 2002/0084463 A1 | 7/2002 | Sanford et al. |
| 2002/0101172 A1 | 8/2002 | Bu |
| 2002/0105279 A1 | 8/2002 | Kimura |
| 2002/0117722 A1 | 8/2002 | Osada et al. |
| 2002/0122308 A1 | 9/2002 | Ikeda |
| 2002/0158587 A1 | 10/2002 | Komiya |
| 2002/0158666 A1 | 10/2002 | Azami et al. |
| 2002/0158823 A1 | 10/2002 | Zavracky et al. |
| 2002/0167474 A1 | 11/2002 | Everitt |
| 2002/0180369 A1 | 12/2002 | Koyama |
| 2002/0180721 A1 | 12/2002 | Kimura et al. |
| 2002/0181276 A1 | 12/2002 | Yamazaki |
| 2002/0186214 A1 | 12/2002 | Siwinski |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 | 1/2003 | Oomura |
| 2003/0030603 A1 | 2/2003 | Shimoda |
| 2003/0043088 A1 | 3/2003 | Booth et al. |
| 2003/0057895 A1 | 3/2003 | Kimura |
| 2003/0058226 A1 | 3/2003 | Bertram et al. |
| 2003/0062524 A1 | 4/2003 | Kimura |
| 2003/0063081 A1 | 4/2003 | Kimura et al. |
| 2003/0071821 A1 | 4/2003 | Sundahl et al. |
| 2003/0076048 A1 | 4/2003 | Rutherford |
| 2003/0090447 A1 | 5/2003 | Kimura |
| 2003/0090481 A1 | 5/2003 | Kimura |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0122813 A1 | 7/2003 | Ishizuki et al. |
| 2003/0142088 A1 | 7/2003 | LeChevalier |
| 2003/0151569 A1 | 8/2003 | Lee et al. |
| 2003/0156101 A1 | 8/2003 | Le Chevalier |
| 2003/0174152 A1 | 9/2003 | Noguchi |
| 2003/0179626 A1 | 9/2003 | Sanford et al. |
| 2003/0185438 A1 | 10/2003 | Osawa et al. |
| 2003/0197663 A1 | 10/2003 | Lee et al. |
| 2003/0210256 A1 | 11/2003 | Mori et al. |
| 2003/0230141 A1 | 12/2003 | Gilmour et al. |
| 2003/0230980 A1 | 12/2003 | Forrest et al. |
| 2003/0231148 A1 | 12/2003 | Lin et al. |
| 2004/0032382 A1 | 2/2004 | Cok et al. |
| 2004/0041750 A1 | 3/2004 | Abe |
| 2004/0066357 A1 | 4/2004 | Kawasaki |
| 2004/0070557 A1 | 4/2004 | Asano et al. |
| 2004/0070565 A1 | 4/2004 | Nayar et al. |
| 2004/0090186 A1 | 5/2004 | Kanauchi et al. |
| 2004/0090400 A1 | 5/2004 | Yoo |
| 2004/0095297 A1 | 5/2004 | Libsch et al. |
| 2004/0100427 A1 | 5/2004 | Miyazawa |
| 2004/0108518 A1 | 6/2004 | Jo |
| 2004/0135749 A1 | 7/2004 | Kondakov et al. |
| 2004/0140982 A1 | 7/2004 | Pate |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174349 A1 | 9/2004 | Libsch et al. |
| 2004/0174354 A1 | 9/2004 | Ono et al. |
| 2004/0178743 A1 | 9/2004 | Miller et al. |
| 2004/0183759 A1 | 9/2004 | Stevenson et al. |
| 2004/0196275 A1 | 10/2004 | Hattori |
| 2004/0207615 A1 | 10/2004 | Yumoto |
| 2004/0227697 A1 | 11/2004 | Mori |
| 2004/0239596 A1 | 12/2004 | Ono et al. |
| 2004/0252089 A1 | 12/2004 | Ono et al. |
| 2004/0257313 A1 | 12/2004 | Kawashima et al. |
| 2004/0257353 A1 | 12/2004 | Imamura et al. |
| 2004/0257355 A1 | 12/2004 | Naugler |
| 2004/0263437 A1 | 12/2004 | Hattori |
| 2004/0263444 A1 | 12/2004 | Kimura |

(56) References Cited

U.S. PATENT DOCUMENTS

| | | |
|---|---|---|
| 2004/0263445 A1 | 12/2004 | Inukai et al. |
| 2004/0263541 A1 | 12/2004 | Takeuchi et al. |
| 2005/0007355 A1 | 1/2005 | Miura |
| 2005/0007357 A1 | 1/2005 | Yamashita et al. |
| 2005/0007392 A1 | 1/2005 | Kasai et al. |
| 2005/0017650 A1 | 1/2005 | Fryer et al. |
| 2005/0024081 A1 | 2/2005 | Kuo et al. |
| 2005/0024393 A1 | 2/2005 | Kondo et al. |
| 2005/0030267 A1 | 2/2005 | Tanghe et al. |
| 2005/0057484 A1 | 3/2005 | Diefenbaugh et al. |
| 2005/0057580 A1 | 3/2005 | Yamano et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0068275 A1 | 3/2005 | Kane |
| 2005/0073264 A1 | 4/2005 | Matsumoto |
| 2005/0083323 A1 | 4/2005 | Suzuki et al. |
| 2005/0088103 A1 | 4/2005 | Kageyama et al. |
| 2005/0110420 A1 | 5/2005 | Arnold et al. |
| 2005/0110807 A1 | 5/2005 | Chang |
| 2005/0140598 A1 | 6/2005 | Kim et al. |
| 2005/0140610 A1 | 6/2005 | Smith et al. |
| 2005/0156831 A1 | 7/2005 | Yamazaki et al. |
| 2005/0162079 A1 | 7/2005 | Sakamoto |
| 2005/0168416 A1 | 8/2005 | Hashimoto et al. |
| 2005/0179626 A1 | 8/2005 | Yuki et al. |
| 2005/0179628 A1 | 8/2005 | Kimura |
| 2005/0185200 A1 | 8/2005 | Tobol |
| 2005/0200575 A1 | 9/2005 | Kim et al. |
| 2005/0206590 A1 | 9/2005 | Sasaki et al. |
| 2005/0212787 A1 | 9/2005 | Noguchi et al. |
| 2005/0219184 A1 | 10/2005 | Zehner et al. |
| 2005/0225683 A1 | 10/2005 | Nozawa |
| 2005/0248515 A1 | 11/2005 | Naugler et al. |
| 2005/0269959 A1 | 12/2005 | Uchino et al. |
| 2005/0269960 A1 | 12/2005 | Ono et al. |
| 2005/0280615 A1 | 12/2005 | Cok et al. |
| 2005/0280766 A1 | 12/2005 | Johnson et al. |
| 2005/0285822 A1 | 12/2005 | Reddy et al. |
| 2005/0285825 A1 | 12/2005 | Eom et al. |
| 2006/0001613 A1 | 1/2006 | Routley et al. |
| 2006/0007072 A1 | 1/2006 | Choi et al. |
| 2006/0007249 A1 | 1/2006 | Reddy et al. |
| 2006/0012310 A1 | 1/2006 | Chen et al. |
| 2006/0012311 A1 | 1/2006 | Ogawa |
| 2006/0022305 A1 | 2/2006 | Yamashita |
| 2006/0027807 A1 | 2/2006 | Nathan et al. |
| 2006/0030084 A1 | 2/2006 | Young |
| 2006/0038758 A1 | 2/2006 | Routley et al. |
| 2006/0038762 A1 | 2/2006 | Chou |
| 2006/0066533 A1 | 3/2006 | Sato et al. |
| 2006/0077135 A1 | 4/2006 | Cok et al. |
| 2006/0077142 A1 | 4/2006 | Kwon |
| 2006/0082523 A1 | 4/2006 | Guo et al. |
| 2006/0092185 A1 | 5/2006 | Jo et al. |
| 2006/0097628 A1 | 5/2006 | Suh et al. |
| 2006/0097631 A1 | 5/2006 | Lee |
| 2006/0103611 A1 | 5/2006 | Choi |
| 2006/0149493 A1 | 7/2006 | Sambandan et al. |
| 2006/0170623 A1 | 8/2006 | Naugler, Jr. et al. |
| 2006/0176250 A1 | 8/2006 | Nathan et al. |
| 2006/0208971 A1 | 9/2006 | Deane |
| 2006/0214888 A1 | 9/2006 | Schneider et al. |
| 2006/0232522 A1 | 10/2006 | Roy et al. |
| 2006/0244697 A1 | 11/2006 | Lee et al. |
| 2006/0261841 A1 | 11/2006 | Fish |
| 2006/0273997 A1 | 12/2006 | Nathan et al. |
| 2006/0279481 A1 | 12/2006 | Haruna et al. |
| 2006/0284801 A1 | 12/2006 | Yoon et al. |
| 2006/0284895 A1 | 12/2006 | Marcu et al. |
| 2006/0290618 A1 | 12/2006 | Goto |
| 2007/0001937 A1 | 1/2007 | Park et al. |
| 2007/0001939 A1 | 1/2007 | Hashimoto et al. |
| 2007/0008251 A1 | 1/2007 | Kohno et al. |
| 2007/0008268 A1 | 1/2007 | Park et al. |
| 2007/0008297 A1 | 1/2007 | Bassetti |
| 2007/0057873 A1 | 3/2007 | Uchino et al. |
| 2007/0057874 A1 | 3/2007 | Le Roy et al. |
| 2007/0069998 A1 | 3/2007 | Naugler et al. |
| 2007/0075727 A1 | 4/2007 | Nakano et al. |
| 2007/0076226 A1 | 4/2007 | Klompenhouwer et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0097038 A1 | 5/2007 | Yamazaki et al. |
| 2007/0097041 A1 | 5/2007 | Park et al. |
| 2007/0103419 A1 | 5/2007 | Uchino et al. |
| 2007/0115221 A1 | 5/2007 | Buchhauser et al. |
| 2007/0164664 A1 | 7/2007 | Ludwicki et al. |
| 2007/0182671 A1 | 8/2007 | Nathan et al. |
| 2007/0236440 A1 | 10/2007 | Wacyk et al. |
| 2007/0236517 A1 | 10/2007 | Kimpe |
| 2007/0241999 A1 | 10/2007 | Lin |
| 2007/0273294 A1 | 11/2007 | Nagayama |
| 2007/0285359 A1 | 12/2007 | Ono |
| 2007/0290958 A1 | 12/2007 | Cok |
| 2007/0296672 A1 | 12/2007 | Kim et al. |
| 2008/0001525 A1 | 1/2008 | Chao et al. |
| 2008/0001544 A1 | 1/2008 | Murakami et al. |
| 2008/0012804 A1* | 1/2008 | Kim ............... G09G 3/3233 345/82 |
| 2008/0030518 A1 | 2/2008 | Higgins et al. |
| 2008/0036708 A1 | 2/2008 | Shirasaki |
| 2008/0042942 A1 | 2/2008 | Takahashi |
| 2008/0042948 A1 | 2/2008 | Yamashita et al. |
| 2008/0048951 A1 | 2/2008 | Naugler, Jr. et al. |
| 2008/0055209 A1 | 3/2008 | Cok |
| 2008/0055211 A1 | 3/2008 | Ogawa |
| 2008/0074413 A1 | 3/2008 | Ogura |
| 2008/0088549 A1 | 4/2008 | Nathan et al. |
| 2008/0088648 A1 | 4/2008 | Nathan et al. |
| 2008/0111766 A1 | 5/2008 | Uchino et al. |
| 2008/0116787 A1 | 5/2008 | Hsu et al. |
| 2008/0117144 A1 | 5/2008 | Nakano et al. |
| 2008/0136770 A1 | 6/2008 | Peker et al. .................. 345/102 |
| 2008/0150845 A1 | 6/2008 | Ishii et al. |
| 2008/0150847 A1 | 6/2008 | Kim et al. |
| 2008/0158115 A1 | 7/2008 | Cordes et al. |
| 2008/0158648 A1 | 7/2008 | Cummings |
| 2008/0170004 A1* | 7/2008 | Jung ............... G09G 3/3233 345/76 |
| 2008/0198103 A1 | 8/2008 | Toyomura et al. |
| 2008/0211749 A1 | 9/2008 | Weitbruch et al. |
| 2008/0231558 A1* | 9/2008 | Naugler ............ G09G 3/3233 345/76 |
| 2008/0231562 A1 | 9/2008 | Kwon |
| 2008/0231625 A1 | 9/2008 | Minami et al. |
| 2008/0252223 A1 | 10/2008 | Toyoda et al. |
| 2008/0252571 A1 | 10/2008 | Hente et al. |
| 2008/0259020 A1 | 10/2008 | Fisekovic et al. |
| 2008/0290805 A1 | 11/2008 | Yamada et al. |
| 2008/0297055 A1 | 12/2008 | Miyake et al. |
| 2009/0058772 A1 | 3/2009 | Lee |
| 2009/0109142 A1 | 4/2009 | Takahara |
| 2009/0121994 A1 | 5/2009 | Miyata |
| 2009/0146926 A1 | 6/2009 | Sung et al. |
| 2009/0160743 A1 | 6/2009 | Tomida et al. |
| 2009/0174628 A1 | 7/2009 | Wang et al. |
| 2009/0184901 A1 | 7/2009 | Kwon |
| 2009/0195483 A1 | 8/2009 | Naugler, Jr. et al. |
| 2009/0201281 A1 | 8/2009 | Routley et al. |
| 2009/0206764 A1 | 8/2009 | Schemmann et al. |
| 2009/0213046 A1 | 8/2009 | Nam |
| 2009/0244046 A1 | 10/2009 | Seto |
| 2010/0004891 A1 | 1/2010 | Ahlers et al. |
| 2010/0026725 A1 | 2/2010 | Smith |
| 2010/0039422 A1 | 2/2010 | Seto |
| 2010/0039458 A1 | 2/2010 | Nathan et al. |
| 2010/0060911 A1 | 3/2010 | Marcu et al. |
| 2010/0079419 A1 | 4/2010 | Shibusawa |
| 2010/0103203 A1* | 4/2010 | Choi ............... G09G 3/3283 345/690 |
| 2010/0165002 A1 | 7/2010 | Ahn |
| 2010/0194670 A1 | 8/2010 | Cok |

(56) References Cited

U.S. PATENT DOCUMENTS

| | | | |
|---|---|---|---|
| 2010/0207960 | A1 | 8/2010 | Kimpe et al. |
| 2010/0225630 | A1 | 9/2010 | Levey et al. |
| 2010/0251295 | A1 | 9/2010 | Amento et al. |
| 2010/0277400 | A1 | 11/2010 | Jeong |
| 2010/0315319 | A1 | 12/2010 | Cok et al. |
| 2011/0063197 | A1 | 3/2011 | Chung et al. |
| 2011/0069051 | A1 | 3/2011 | Nakamura et al. |
| 2011/0069089 | A1 | 3/2011 | Kopf et al. |
| 2011/0074750 | A1 | 3/2011 | Leon et al. |
| 2011/0149166 | A1 | 6/2011 | Botzas et al. |
| 2011/0181630 | A1 | 7/2011 | Smith et al. |
| 2011/0199395 | A1 | 8/2011 | Nathan et al. |
| 2011/0227964 | A1 | 9/2011 | Chaji et al. |
| 2011/0273399 | A1 | 11/2011 | Lee |
| 2011/0293480 | A1 | 12/2011 | Mueller |
| 2012/0056558 | A1 | 3/2012 | Toshiya et al. |
| 2012/0062565 | A1 | 3/2012 | Fuchs et al. |
| 2012/0262184 | A1 | 10/2012 | Shen |
| 2012/0299978 | A1 | 11/2012 | Chaji |
| 2013/0027381 | A1 | 1/2013 | Nathan et al. |
| 2013/0057595 | A1 | 3/2013 | Nathan et al. |
| 2013/0112960 | A1 | 5/2013 | Chaji et al. |
| 2013/0135272 | A1 | 5/2013 | Park |
| 2013/0309821 | A1 | 11/2013 | Yoo et al. |
| 2013/0321671 | A1 | 12/2013 | Cote et al. |

FOREIGN PATENT DOCUMENTS

| | | | |
|---|---|---|---|
| CA | 2 249 592 | | 7/1998 |
| CA | 2 368 386 | | 9/1999 |
| CA | 2 242 720 | | 1/2000 |
| CA | 2 354 018 | | 6/2000 |
| CA | 2 432 530 | | 7/2002 |
| CA | 2 436 451 | | 8/2002 |
| CA | 2 438 577 | | 8/2002 |
| CA | 2 463 653 | | 1/2004 |
| CA | 2 498 136 | | 3/2004 |
| CA | 2 522 396 | | 11/2004 |
| CA | 2 443 206 | | 3/2005 |
| CA | 2 472 671 | | 12/2005 |
| CA | 2 567 076 | | 1/2006 |
| CA | 2 526 782 | | 4/2006 |
| CA | 2 541 531 | | 7/2006 |
| CA | 2 550 102 | | 4/2008 |
| CA | 2 773 699 | | 10/2013 |
| CN | 1381032 | | 11/2002 |
| CN | 1448908 | | 10/2003 |
| CN | 1682267 | A | 10/2005 |
| CN | 1760945 | | 4/2006 |
| CN | 1886774 | | 12/2006 |
| CN | 102656621 | | 9/2012 |
| EP | 0 158 366 | | 10/1985 |
| EP | 1 028 471 | | 8/2000 |
| EP | 1 111 577 | | 6/2001 |
| EP | 1 130 565 | A1 | 9/2001 |
| EP | 1 194 013 | | 4/2002 |
| EP | 1 335 430 | A1 | 8/2003 |
| EP | 1 372 136 | | 12/2003 |
| EP | 1 381 019 | | 1/2004 |
| EP | 1 418 566 | | 5/2004 |
| EP | 1 429 312 | A | 6/2004 |
| EP | 145 0341 | A | 8/2004 |
| EP | 1 465 143 | A | 10/2004 |
| EP | 1 469 448 | A | 10/2004 |
| EP | 1 521 203 | A2 | 4/2005 |
| EP | 1 594 347 | | 11/2005 |
| EP | 1 784 055 | A2 | 5/2007 |
| EP | 1854338 | A1 | 11/2007 |
| EP | 1 879 169 | A1 | 1/2008 |
| EP | 1 879 172 | | 1/2008 |
| GB | 2 389 951 | | 12/2003 |
| JP | 1272298 | | 10/1989 |
| JP | 4-042619 | | 2/1992 |
| JP | 6-314977 | | 11/1994 |
| JP | 8-340243 | | 12/1996 |
| JP | 09-090405 | | 4/1997 |
| JP | 10-254410 | | 9/1998 |
| JP | 11-202295 | | 7/1999 |
| JP | 11-219146 | | 8/1999 |
| JP | 11 231805 | | 8/1999 |
| JP | 11-282419 | | 10/1999 |
| JP | 2000-056847 | | 2/2000 |
| JP | 2000-081607 | * | 3/2000 |
| JP | 2000-81607 | | 3/2000 |
| JP | 2001-134217 | | 5/2001 |
| JP | 2001-195014 | | 7/2001 |
| JP | 2002-055654 | | 2/2002 |
| JP | 2002-91376 | | 3/2002 |
| JP | 2002-514320 | | 5/2002 |
| JP | 2002-278513 | | 9/2002 |
| JP | 2002-333862 | | 11/2002 |
| JP | 2003-076331 | | 3/2003 |
| JP | 2003-124519 | | 4/2003 |
| JP | 2003-177709 | | 6/2003 |
| JP | 2003-271095 | | 9/2003 |
| JP | 2003-308046 | | 10/2003 |
| JP | 2003-317944 | | 11/2003 |
| JP | 2004-004675 | | 1/2004 |
| JP | 2004-145197 | | 5/2004 |
| JP | 2004-287345 | | 10/2004 |
| JP | 2005-057217 | | 3/2005 |
| JP | 2007-065015 | | 3/2007 |
| JP | 2008-102335 | | 5/2008 |
| JP | 4-158570 | | 10/2008 |
| KR | 2004-0100887 | | 12/2004 |
| TW | 342486 | | 10/1998 |
| TW | 473622 | | 1/2002 |
| TW | 485337 | | 5/2002 |
| TW | 502233 | | 9/2002 |
| TW | 538650 | | 6/2003 |
| TW | 1221268 | | 9/2004 |
| TW | 1223092 | | 11/2004 |
| TW | 200727247 | | 7/2007 |
| WO | WO 98/48403 | | 10/1998 |
| WO | WO 99/48079 | | 9/1999 |
| WO | WO 01/06484 | | 1/2001 |
| WO | WO 01/27910 | A1 | 4/2001 |
| WO | WO 01/63587 | A2 | 8/2001 |
| WO | WO 02/067327 | A | 8/2002 |
| WO | WO 03/001496 | A1 | 1/2003 |
| WO | WO 03/034389 | A | 4/2003 |
| WO | WO 03/058594 | A1 | 7/2003 |
| WO | WO 03/063124 | | 7/2003 |
| WO | WO 03/077231 | | 9/2003 |
| WO | WO 2004/003877 | | 1/2004 |
| WO | WO 2004/025615 | A | 3/2004 |
| WO | WO 2004/034364 | | 4/2004 |
| WO | WO 2004/047058 | | 6/2004 |
| WO | WO 2004/104975 | A1 | 12/2004 |
| WO | WO 2005/022498 | | 3/2005 |
| WO | WO 2005/022500 | A | 3/2005 |
| WO | WO 2005/029455 | | 3/2005 |
| WO | WO 2005/029456 | | 3/2005 |
| WO | WO 2005/055185 | | 6/2005 |
| WO | WO 2006/000101 | A1 | 1/2006 |
| WO | WO 2006/053424 | | 5/2006 |
| WO | WO 2006/063448 | A | 6/2006 |
| WO | WO 2006/084360 | | 8/2006 |
| WO | WO 2007/003877 | A | 1/2007 |
| WO | WO 2007/079572 | | 7/2007 |
| WO | WO 2007/120849 | A2 | 10/2007 |
| WO | WO 2009/048618 | | 4/2009 |
| WO | WO 2009/055920 | | 5/2009 |
| WO | WO 2010/023270 | | 3/2010 |
| WO | WO 2011/041224 | A1 | 4/2011 |
| WO | WO 2011/064761 | A1 | 6/2011 |
| WO | WO 2011/067729 | | 6/2011 |
| WO | WO 2012/160424 | A1 | 11/2012 |
| WO | WO 2012/160471 | | 11/2012 |

(56) References Cited

FOREIGN PATENT DOCUMENTS

| | | | |
|---|---|---|---|
| WO | WO 2012/164474 A2 | 12/2012 | |
| WO | WO 2012/164475 A2 | 12/2012 | |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A Novel Driving Scheme for High Resolution Large-area a-Si:H AMOLED displays"; dated Aug. 2005 (3 pages).
Chaji et al.: "A Stable Voltage-Programmed Pixel Circuit for a-Si:H AMOLED Displays"; dated Dec. 2006 (12 pages).
Chaji et al.: "A Sub-µA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated My 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for Application No. EP 01 11 22313 dated Sep. 14, 2005 (4 pages).
European Search Report for Application No. EP 04 78 6661 dated Mar. 9, 2009.
European Search Report for Application No. EP 05 75 9141 dated Oct. 30, 2009 (2 pages).
European Search Report for Application No. EP 05 81 9617 dated Jan. 30, 2009.
European Search Report for Application No. EP 06 70 5133 dated Jul. 18, 2008.
European Search Report for Application No. EP 06 72 1798 dated Nov. 12, 2009 (2 pages).
European Search Report for Application No. EP 07 71 0608.6 dated Mar. 19, 2010 (7 pages).
European Search Report for Application No. EP 07 71 9579 dated May 20, 2009.
European Search Report for Application No. EP 07 81 5784 dated Jul. 20, 2010 (2 pages).
European Search Report for Application No. EP 10 16 6143, dated Sep. 3, 2010 (2 pages).
European Search Report for Application No. EP 10 83 4294.0/1903, dated Apr. 8, 2013, (9 pages).
European Search Report for Application No. PCT/CA2006/000177 dated Jun. 2, 2006.
European Supplementary Search Report for Application No. EP 04 78 6662 dated Jan. 19, 2007 (2 pages).
Extended European Search Report for Application No. 11 73 9485.8 mailed Aug. 6, 2013(14 pages).
Extended European Search Report for Application No. EP 09 73 3076.5, mailed Apr. 27, (13 pages).
Extended European Search Report for Application No. EP 11 16 8677.0, mailed Nov. 29, 2012, (13 page).
Extended European Search Report for Application No. EP 11 19 1641.7 mailed Jul. 11, 2012 (14 pages).
Extended European Search Report for Application No. EP 14158051.4, mailed Jul. 29, 2014, (4 pages).
Fossum, Eric R.. "Active Pixel Sensors: Are CCD's Dinosaurs?" SPIE: Symposium on Electronic Imaging. Feb. 1, 1993 (13 pages).
Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
International Preliminary Report on Patentability for Application No. PCT/CA2005/001007 dated Oct. 16, 2006, 4 pages.
International Search Report for Application No. PCT/CA2004/001741 dated Feb. 21, 2005.
International Search Report for Application No. PCT/CA2004/001742, Canadian Patent Office, dated Feb. 21, 2005 (2 pages).
International Search Report for Application No. PCT/CA2005/001007 dated Oct. 18, 2005.
International Search Report for Application No. PCT/CA2005/001897, mailed Mar. 21, 2006 (2 pages).
International Search Report for Application No. PCT/CA2007/000652 dated Jul. 25, 2007.
International Search Report for Application No. PCT/CA2009/000501, mailed Jul. 30, 2009 (4 pages).
International Search Report for Application No. PCT/CA2009/001769, dated Apr. 8, 2010 (3 pages).
International Search Report for Application No. PCT/IB2010/055481, dated Apr. 7, 2011, 3 pages.
International Search Report for Application No. PCT/IB2010/055486, Dated Apr. 19, 2011, 5 pages.
International Search Report for Application No. PCT/IB2010/055541 filed Dec. 1, 2010, dated May 26, 2011; 5 pages.

(56) References Cited

OTHER PUBLICATIONS

International Search Report for Application No. PCT/IB2011/050502, dated Jun. 27, 2011 (6 pages).
International Search Report for Application No. PCT/IB2011/051103, dated Jul. 8, 2011, 3 pages.
International Search Report for Application No. PCT/IB2011/055135, Canadian Patent Office, dated Apr. 16, 2012 (5 pages).
International Search Report for Application No. PCT/IB2012/052372, mailed Sep. 12, 2012 (3 pages).
International Search Report for Application No. PCT/IB2013/054251, Canadian Intellectual Property Office, dated Sep. 11, 2013; (4 pages).
International Search Report for Application No. PCT/IB2014/058244, Canadian Intellectual Property Office, dated Apr. 11, 2014; (6 pages).
International Search Report for Application No. PCT/IB2014/059753, Canadian Intellectual Property Office, dated Jun. 23, 2014; (6 pages).
International Search Report for Application No. PCT/JP02/09668, mailed Dec. 3, 2002, (4 pages).
International Written Opinion for Application No. PCT/CA2004/001742, Canadian Patent Office, dated Feb. 21, 2005 (5 pages).
International Written Opinion for Application No. PCT/CA2005/001897, mailed Mar. 21, 2006 (4 pages).
International Written Opinion for Application No. PCT/CA2009/000501 mailed Jul. 30, 2009 (6 pages).
International Written Opinion for Application No. PCT/IB2010/055481, dated Apr. 7, 2011, 6 pages.
International Written Opinion for Application No. PCT/IB2010/055486, Dated Apr. 19, 2011, 8 pages.
International Written Opinion for Application No. PCT/IB2010/055541, dated May 26, 2011; 6 pages.
International Written Opinion for Application No. PCT/IB2011/050502, dated Jun. 27, 2011 (7 pages).
International Written Opinion for Application No. PCT/IB2011/051103, dated Jul. 8, 2011, 6 pages.
International Written Opinion for Application No. PCT/IB2011/055135, Canadian Patent Office, dated Apr. 16, 2012 (5 pages).
International Written Opinion for Application No. PCT/IB2012/052372, mailed Sep. 12, 2012 (6 pages).
International Written Opinion for Application No. PCT/IB2013/054251, Canadian Intellectual Property Office, dated Sep. 11, 2013; (5 pages).
International Written Opinion for Application No. PCT/IB2014/060879, Canadian Intellectual Property Office, dated Jul. 17, 2014; (4 pages).
Jafarabadiashtiani et al.: "A New Driving Method for a-Si AMOLED Displays Based on Voltage Feedback"; dated 2005 (4 pages).
Jafarabadiashtiani: Pixel circuits and driving schemes for active-matrix organic light emitting diode displays, copyright 2007, 188 pages.
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee et al.: "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages).
Ma E Y et al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).

Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for active Matrix Organic Light Emitting Diode Displays,"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)"; dated 2006 (4 pages).
Office Action in Chinese Patent Invention No. 201180008188.9, dated Jun. 4, 2014 (17 pages) (w/English translation).
Office Action in Japanese patent application No. JP2006-527247 dated Mar. 15, 2010. (8 pages).
Office Action in Japanese patent application No. JP2007-545796 dated Sep. 5, 2011. (8 pages).
Office Action in Japanese patent application No. JP2012-541612 dated Jul. 15, 2014. (3 pages).
Partial European Search Report for Application No. EP 11 168 677.0, mailed Sep. 22, 2011 (5 pages).
Partial European Search Report for Application No. EP 11 19 1641.7, mailed Mar. 20, 2012 (8 pages).
Philipp: "Charge transfer sensing" Sensor Review, vol. 19, No. 2, Dec. 31, 1999 (Dec. 31, 1999), 10 pages.
Rafati et al.: "Comparison of a 17 b multiplier in Dual-rail domino and in Dual-rail D L (D L) logic styles"; dated 2002 (4 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Safavian et al.: "Three-TFT image sensor for real-time digital X-ray imaging"; dated Feb. 2, 2006 (2 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Singh, et al., "Current Conveyor: Novel Universal Active Block", Samriddhi, S-JPSET vol. I, Issue 1, 2010, pp. 41-48 (12EPPT).
Smith, Lindsay I., "A tutorial on Principal Components Analysis," dated Feb. 26, 2001 (27 pages).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Written Opinion for Application No. PCT/IB2014/059753, Canadian Intellectual Property Office, dated Jun. 12, 2014 (6 pages).
Written Opinion for Application No. PCT/IB2014/060879, Canadian Intellectual Property Office, dated Jul. 17, 2014 (3 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).

* cited by examiner

SYSTEM AND METHODS FOR THERMAL COMPENSATION IN AMOLED DISPLAYS

CROSS REFERENCE TO RELATED APPLICATIONS

This application is a continuation of U.S. patent application Ser. No. 12/958,655, filed Dec. 2, 2010, which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to active matrix organic light emitting device (AMOLED) displays, and particularly determining thermal conditions of the pixels of such displays.

BACKGROUND

Currently, active matrix organic light emitting device ("AMOLED") displays are being introduced. The advantages of such displays include lower power consumption, manufacturing flexibility and faster refresh rate over conventional liquid crystal displays. In contrast to conventional liquid crystal displays, there is no backlighting in an AMOLED display as each pixel consists of different colored OLEDs emitting light independently. The OLEDs emit light based on current supplied through a drive transistor. The power consumed in each pixel has a direct relation with the magnitude of the generated light in that pixel. As a result, the uneven power consumption profile, the anisotropic lateral heat conduction of the panel (e.g. lower conduction in the panel edges), and the differential heat convection in vertical orientation lead to a highly non-uniform surface temperature profile.

The non-uniformity of the temperature severely impacts the quality of the display by adding visual spatio-temporal artifacts. That is due to the strong thermo-electrical-optical coupling in the characteristics of the pixel circuits, such as the thermal dependency of the voltage-current characteristic of the thin film transistors (TFTs) that are used as drive transistors and their short-time threshold voltage aging rate. The drive-in current of the TFT determines the pixel's OLED luminance. Since the pixel circuits are voltage programmable, the spatial-temporal thermal profile of the display surface changing the voltage-current characteristic of the drive transistor impacts the quality of the display. The rate of the short-time aging of the thin film transistor devices is also temperature dependent. If the temperature of each pixel is known, proper corrections can be applied to the video stream in order to compensate for the unwanted thermal-driven visual effects.

However, determining the temperature of each pixel presents difficulties in the need for additional components such as thermal sensors and/or additional computational circuitry to analyze the performance of each pixel during the use of the display. Accurate yet efficient real-time extraction of surface thermal profiles is therefore needed. Such information is critical to provide proper compensation for the thermal effects in large area AMOLED displays.

SUMMARY

Aspects of the present disclosure include a current-biased, voltage-programmed display panel allowing measurement of temperature. The panel includes a plurality of pixels each including a drive transistor and an organic light emitting device coupled to the drive transistor. A controller is coupled to each of the plurality of pixels. The controller causes a programming voltage to be applied to the gate of the respective drive transistors to control the brightness of each pixel. The controller further reads data from selected ones of the plurality of pixels to determine the temperature of the selected ones of the plurality of pixels. The controller estimates the temperature of the other non-selected plurality of pixels based on the determined temperature of the selected ones of the plurality of pixels.

Another aspect of the present disclosure is a method of determining the temperature profile of an active matrix organic light emitting device display including a plurality of organic light emitting device pixels. Each pixel has a programming voltage input to determine brightness. The temperature of selected ones of the plurality of pixels is determined. The selected pixels are less than all of the plurality of pixels. The temperature of the rest of the non-selected plurality of pixels is estimated using the determined temperature of the selected ones of the plurality of pixels.

Another aspect of the present disclosure is a non-transitory machine readable medium having stored thereon instructions for determining a temperature profile of an active matrix organic light emitting device display including a plurality of organic light emitting device pixels. Each pixel has a programming voltage input to determine brightness. The instructions include machine executable code which when executed by at least one machine, causes the machine to determine the temperature of selected ones of the plurality of pixels, the selected ones being less than all of the plurality of pixels. The instructions also cause the machine to estimate the temperature of the rest of the non-selected plurality of pixels using the determined temperature of the selected ones of the plurality of pixels.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
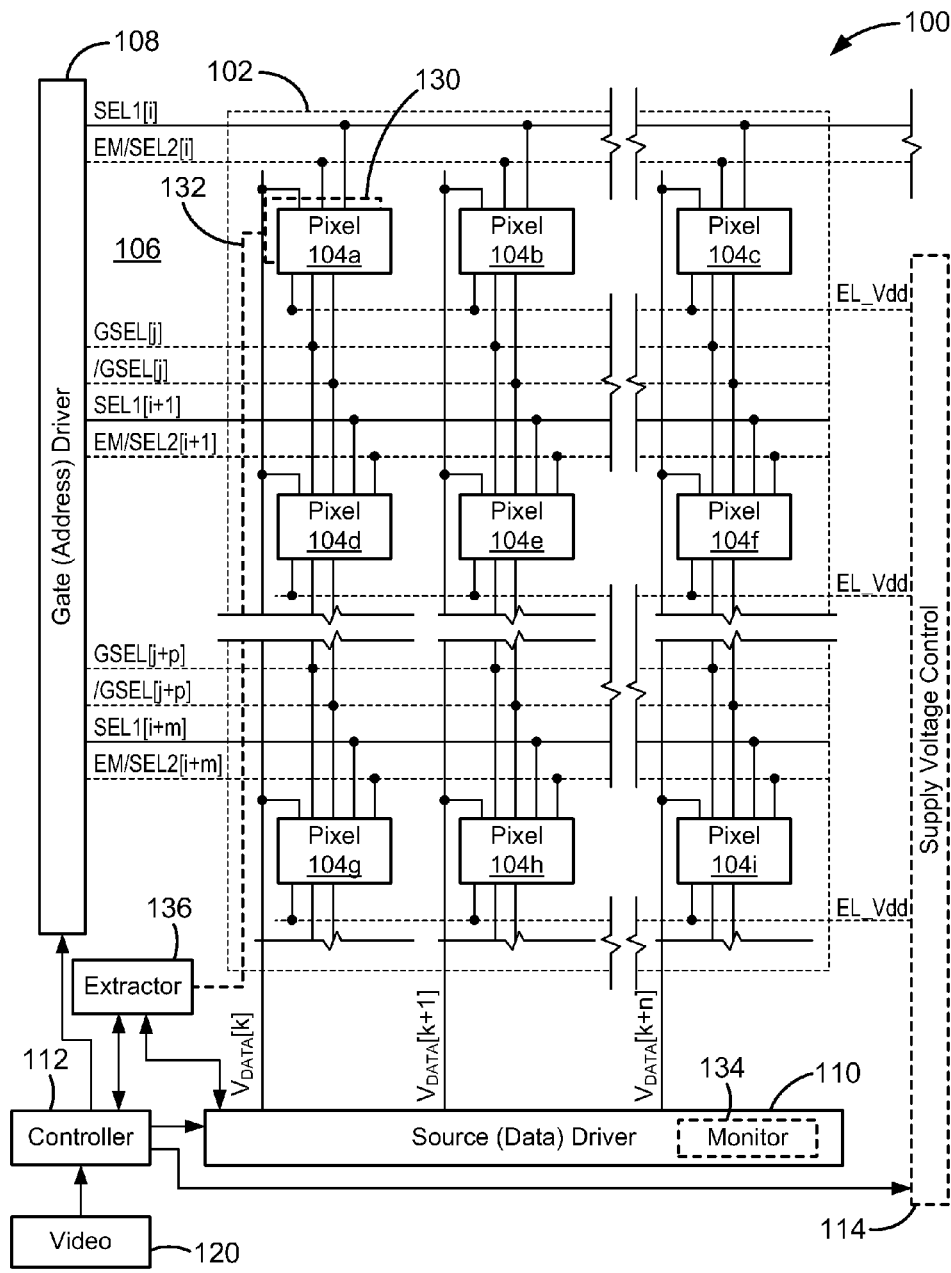
FIG. 1 is a block diagram of a AMOLED display with temperature compensation control.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is an electronic display system 100 having an active matrix area or pixel array 102 in which an array of pixels 104a-d are arranged in a row and column configuration. For ease of illustration, only two rows and columns are shown. External to the active matrix area 102 is a peripheral area 106 where peripheral circuitry for driving and controlling the pixel area 102 are disposed. The peripheral circuitry includes a gate or address driver circuit 108, a source or data driver circuit 110, a controller 112, and an optional supply voltage (e.g., Vdd) driver 114. The controller 112 controls the gate, source, and supply voltage drivers 108, 110, 114. The gate driver 108, under control of the controller 112, operates on address or select lines SEL[i], SEL[i+1], and so forth, one for each row of pixels 104a-i in the pixel array 102. In pixel sharing configurations described below, the gate or address driver circuit 108 can also optionally operate on global select lines GSEL[j] and optionally/GSEL[j], which operate on multiple rows of pixels 104a-i in the pixel array 102, such as every two rows of pixels 104a-d. The source driver circuit 110, under control of the controller 112, operates on voltage data lines Vdata[k], Vdata[k+1], and so forth, one for each column of pixels 104a-i in the pixel array 102. The voltage data lines carry voltage programming information to each pixel 104a-i indicative of brightness of each light emitting device in the pixels 104a-i. A storage element, such as a capacitor, in each pixel 104a-i stores the voltage programming information until an emission or driving cycle turns on the light emitting device. The optional supply voltage driver 114, under control of the controller 112, controls a supply voltage (EL_Vdd) line, one for each row of pixels 104a-i in the pixel array 102.

The display system 100 may also include a current source circuit, which supplies a fixed current on current bias lines. In some configurations, a reference current can be supplied to the current source circuit. In such configurations, a current source control controls the timing of the application of a bias current on the current bias lines. In configurations in which the reference current is not supplied to the current source circuit, a current source address driver controls the timing of the application of a bias current on the current bias lines.

As is known, each pixel 104a-i in the display system 100 needs to be programmed with information indicating the brightness of the light emitting device in the pixel 104a-i. A frame defines the time period that includes a programming cycle or phase during which each and every pixel in the display system 100 is programmed with a programming voltage indicative of a brightness and a driving or emission cycle or phase during which each light emitting device in each pixel is turned on to emit light at a brightness commensurate with the programming voltage stored in a storage element. A frame is thus one of many still images that compose a complete moving picture displayed on the display system 100. There are at least two schemes for programming and driving the pixels: row-by-row, or frame-by-frame. In row-by-row programming, a row of pixels is programmed and then driven before the next row of pixels is programmed and driven. In frame-by-frame programming, all rows of pixels in the display system 100 are programmed first, and all of the pixels are driven row-by-row. Either scheme can employ a brief vertical blanking time at the beginning or end of each frame during which the pixels are neither programmed nor driven.

The components located outside of the pixel array 102 may be disposed in a peripheral area 106 around the pixel array 102 on the same physical substrate on which the pixel array 102 is disposed. These components include the gate driver 108, the source driver 110 and the optional supply voltage control 114. Alternately, some of the components in the peripheral area can be disposed on the same substrate as the pixel array 102 while other components are disposed on a different substrate, or all of the components in the peripheral area can be disposed on a substrate different from the substrate on which the pixel array 102 is disposed. Together, the gate driver 108, the source driver 110, and the supply voltage control 114 make up a display driver circuit. The display driver circuit in some configurations may include the gate driver 108 and the source driver 110 but not the supply voltage control 114.

In order to facilitate temperature compensation, two general methodologies may be used for the real-time and efficient extraction of the surface temperature profile of the AMOLED display system 100 in FIG. 1 for temperature compensation purposes. One method may extract the full temperature through the use of temperature data. The temperature data may be obtained from various voltage or current measurements or from limited thermal sensors on the AMOLED display system 100. Another method calculates the thermal profile from the video data from the AMOLED display system 100. This method relies on cutting the computational cost significantly with minimal estimation error via selection of limited pixels for temperature measurement. The methods may be performed by the controller 112 in FIG. 1, but other hardware and/or software may perform these methods such as a video processor or a digital signal processor on a device coupled to the display system 100.

FIG. 1 therefore shows the use of limited thermal sensors such as a thermal sensor 130 on a selected pixel 104a of the AMOLED display system 100. The thermal sensor 130 may be integrated on the pixel array 102 or there may be a separate substrate containing a matrix of the thermal sensor components. FIG. 1 shows the optional thermal sensor 130 corresponding to only one of a group of pixels such as the pixel 104a in the pixel array 102. The thermal sensor 130 is coupled to a monitor line 132 that is coupled to the controller 112. Other surrounding pixels such as the pixels 104b-i do not have a thermal sensor. Thus, there are many fewer thermal sensors 130 than pixels 104a-i. For example, all the pixels 104 may be divided into 5 by 5 segments and therefore for each 25 pixels, a single thermal sensor 130 is provided such as for the pixel 104a.

Figure 2:
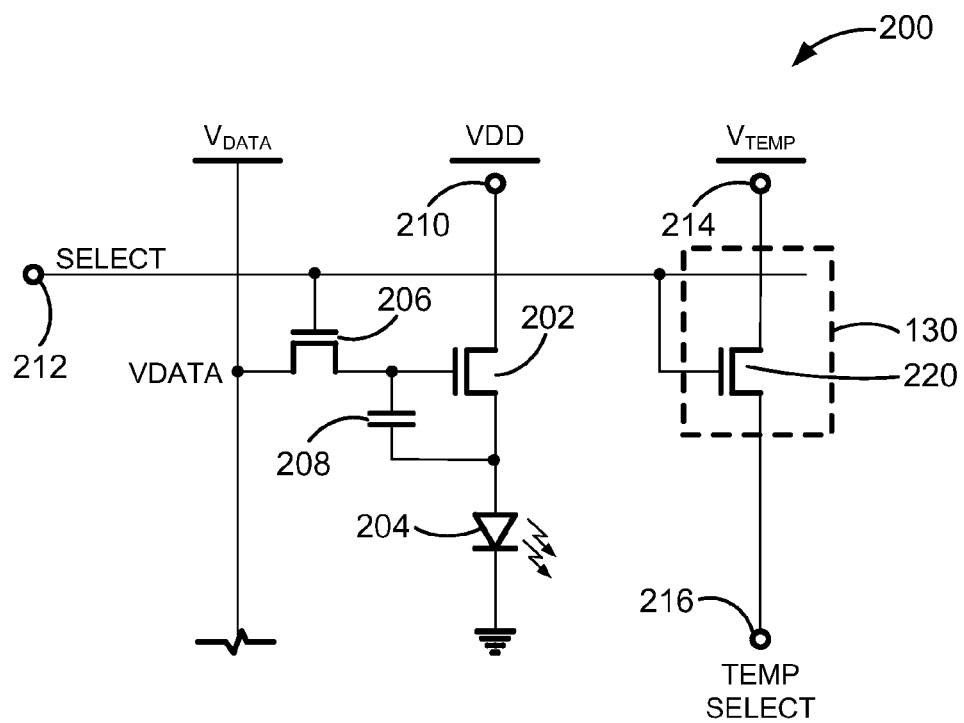
FIG. 2 is a circuit diagram of a drive circuit including a thermal sensor for a selected one of the pixels in the AMOLED display in FIG. 1.

FIG. 2 shows a driver circuit 200 for the thermal sensor 130 that is integrated in the driver circuit 200 for the pixel 104a in FIG. 1. The driver circuit 200 includes a drive transistor 202, an organic light emitting device ("OLED") 204, a select transistor 206 and a source capacitor 208. A voltage source 210 is coupled to the drive transistor 206. A select line 212 is coupled to the select transistor 206. The driver circuit 200 includes a monitor line 214 that is coupled to the drain of a thermal transistor 220 which is part of the thermal sensor 130. The thermal transistor 220 has a source that is coupled to a temperature select line 216. The current through the thermal transistor 220 is a function of the temperature of the pixel 104a. During the readout time, the select line 212 is pulled high which may be in parallel with the pixel programming cycle. The temperature select line 216 will be pulled low and therefore the monitor line 214 will provide access to the current of the transistor 220. Since the current of the transistor 220 will change based on temperature, temperature information may be extracted from this current. Thus, the temperatures of certain pixels in the pixel array 102 such as the pixel 104a are measured by activating the monitor line 214 via the select line 212.

Another method of determining the temperature of selected pixels is by measuring change in output voltage at different points in time which represents temperature of the pixel. Such data may be obtained by monitoring the change in pixel output voltage data such as by methods for detecting shifts in performance due to aging described in application Ser. No. 11/673,512 filed Feb. 9, 2007 (Publication No. 2007/0195020) hereby incorporated by reference. Monitoring a display for the effects of aging requires sampling data from the pixels at a slow rate such as every few frames. However, such data may also be used for thermal measurements based on changes in output voltage from selected pixels during the blanking intervals of each frame.

The temperature of a pixel may be determined based on output voltages measured on a driver circuit such as the data driver 110 that shown in FIG. 1 without the thermal sensor 130 in FIGS. 1 and 2 based on a calibration voltage applied to the gate of the drive transistor of selected pixels such as the pixel 104a during a blank frame or the blanking intervals of each frame. In this example, the data driver 110 has an optional monitor 134 for driving and monitoring the output voltage as shown in FIG. 1. An optional extractor block 136 calculates the temperatures of the selected pixels based on the voltage generated on the output voltage from an output voltage line 138. The data signals to the pixels 104a-i are calibrated for temperature based on the monitoring result (i.e., the change in output voltage). The monitoring result may be provided to the controller 112. The supply voltage may be used by the controller 112 to drive the current for the OLED which in turn represents the temperature of the pixel 104.

Figure 3:
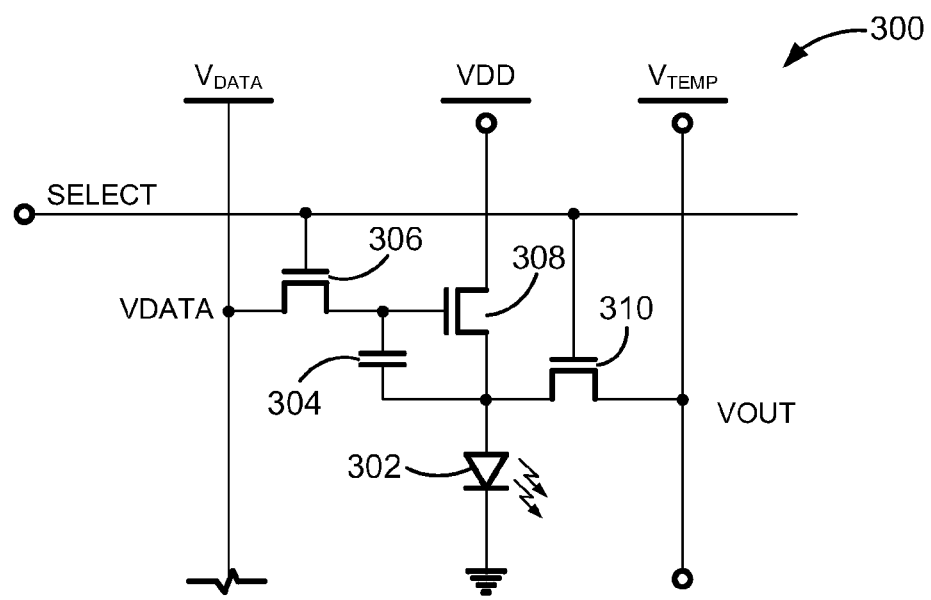
FIG. 3 is a circuit diagram for an alternate drive circuit that allows sensing of voltage data from a selected pixel to determine pixel temperature in the AMOLED display in FIG. 1.

FIG. 3 shows an example of a driver circuit 300 that may be used for selected pixels such as the pixel 104a to determine temperature from separate voltage measurements eliminating the need for a dedicated thermal sensor. The driver circuit 300 in FIG. 3 includes an OLED 302, a storage capacitor 304, a switch transistor 306, and a drive transistor 308.

The drain terminal of the drive transistor 308 is connected to a power supply line VDD from the voltage drive 114 in FIG. 1, and the source terminal of the drive transistor 308 is connected to the OLED 302. The switch transistor 306 is connected between a data line VDATA and the gate terminal of the drive transistor 308. One terminal of the storage capacitor 304 is connected to the gate terminal of the drive transistor 308, and the other terminal of the storage capacitor 304 is connected to the source terminal of the drive transistor 308 and the OLED 302.

A sensing transistor 310 connects the source terminal of the drive transistor 308 and the OLED 302 to the output line (VOUT) 138 which is coupled to the data driver 110 in FIG. 1. The gate terminal of the sensing transistor 310 is connected to the select line input SEL that is controlled by the gate driver 108 in FIG. 1. The effect of temperature on the driver circuit 300 is extracted by monitoring the voltage of the output line 138. The select line input SEL is shared by the switch transistor 306 and the sensing transistor 310. The measurement of the temperature may occur during a blank frame where the gate terminal of the drive transistor 308 is charged to a calibration voltage (VCG) via the data line input. The calibration voltage (VCG) includes the temperature prediction, calculated based on the previous temperature data. During the extraction cycle, the drive transistor 308 acts as an amplifier since it is biased with a constant current through the output voltage (VOUT). The voltage developed on the output voltage (VOUT) as a result of current (Ic) applied to it is ($V_{CD}+\Delta V_{CD}$). Therefore, the effects of temperature on the pixel are amplified, and change of the voltage of the output voltage is a function of the temperature. This enables extraction of very small amount of voltage threshold (VT) shift resulting in highly accurate indication of the temperature of the pixel. The change in the output voltage, VOUT, is monitored. Then, the change(s) in the voltage output, VOUT, is used for determining the temperature of the pixel and thus the calibration of the programming voltage to compensate for the temperature.

The normal operation of the driver circuit 300 includes a programming cycle and a driving cycle. During the programming cycle, the gate terminal of the drive transistor 308 is charged to a calibrated programming voltage using the monitoring result (i.e., the changes of VOUT due to temperature). The charge is held by the charging capacitor 304 and during the driving cycle, the select line SEL is low and the drive transistor 308 provides current to the OLED 302. This operation occurs for all of the driver circuits for the pixels of the pixel array 102. The calibrated programming voltage is determined using the temperature for the selected pixels such as the pixel 104a and an estimated temperature for the non-selected pixels such as pixels 104b-i in the array 102.

Figure 4:
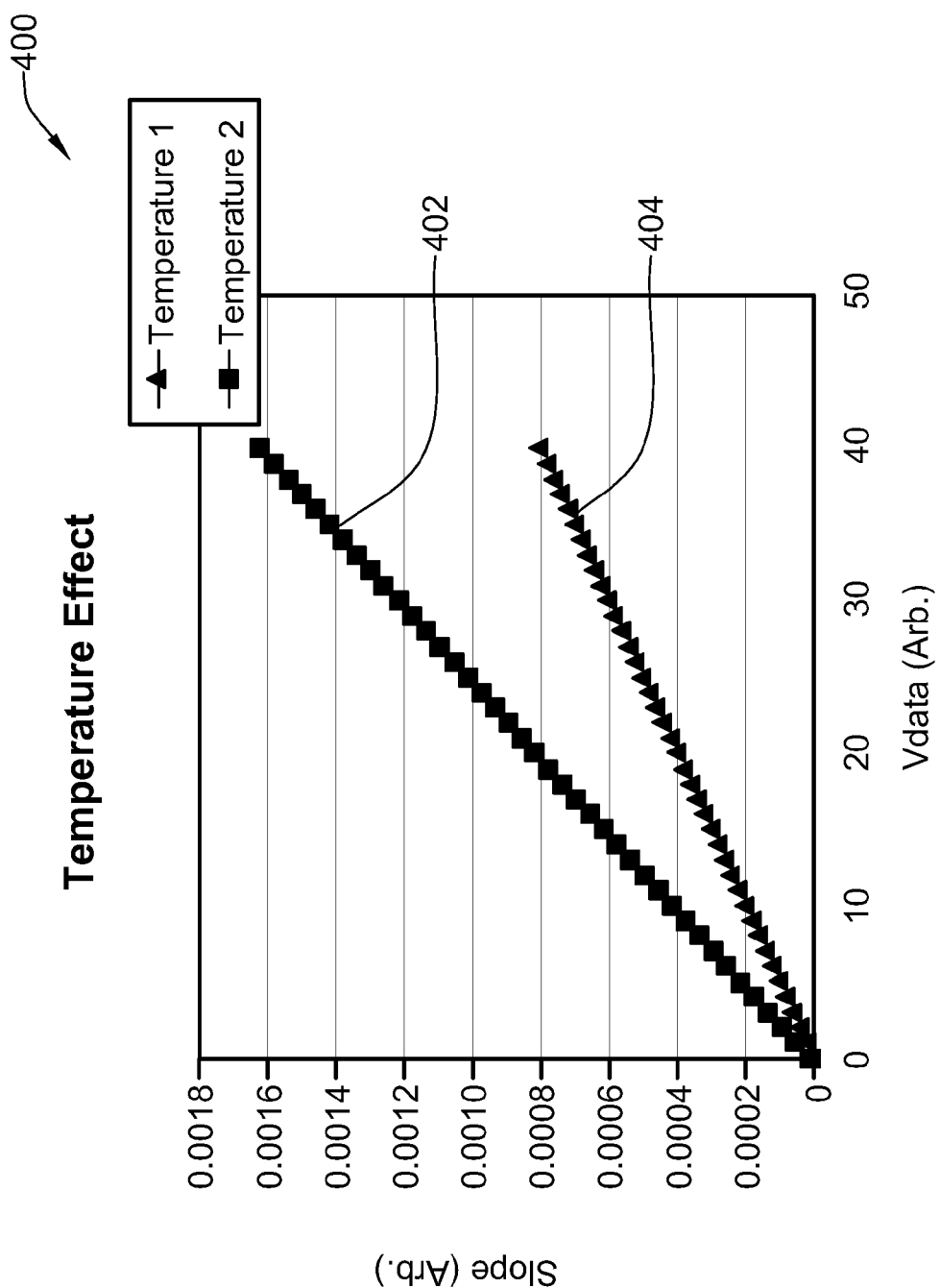
FIG. 4 is a graph showing the effects of temperature on the slope of OLED current over change in programming voltage to the gate of the drive transistor.

FIG. 4 is a graph 400 of the effects the slope of the current of the drive transistor 308 versus the programming voltage level to the data line input VDATA in FIG. 3. The graph 400 includes a first current slope 402 at a first temperature and a second current slope 404 at a second temperature. The slope of the current of the drive transistor 308 is therefore used by the monitor 134 in FIG. 1 to determine the temperature of the pixel. As shown in FIG. 4, temperature affects the performance of the drive transistor 308 significantly by varying the current produced by different levels of programming voltages. Thus, the slope of the IV characteristics of the drive transistor 308 changes by temperature and therefore measuring the output voltage at two points to determine the current at the two points will determine the change. The slope of the current is calculated by $(I_1-I_2)/(V_{data1}-V_{data2})$ where the $I_1$ and $I_2$ are the current of the drive transistor 308 related to programming voltage ($V_{data1}$) at a first point in time and programming voltage ($V_{data2}$) at a second point in time respectively. Thus, any change in the slope can be associated to a particular temperature on the pixel as shown by the different slopes 402 and 404 in FIG. 4.

Once the temperatures of the selected pixels, such as the pixel 104a, are determined whether by a thermal sensor or through measuring the output voltages as described above, the temperature of the remaining non-selected pixels in the array 102 around each of the selected pixels may be interpolated using a number of different techniques including nearest neighbor, bilinear, bicubic or Kriging.

Figure 5A:
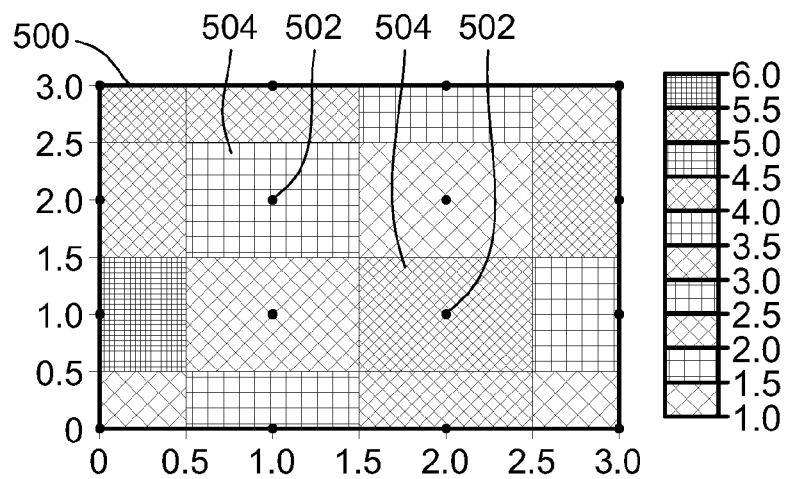
FIG. 5A-5C are thermal graphs of the allocation of temperature on the AMOLED display in FIG. 1 using different interpolation methods.

The nearest neighbor interpolation method sets the temperature of all of the neighboring pixels around the selected pixels to the same temperature measured by the pixel. FIG. 5A is a graph 500 showing the temperature determined by the nearest neighbor method. The shades in FIG. 5A represent different temperatures assigned based on the selected pixel temperature. The selected pixels 502 produce temperature measurements either through a temperature sensor or via calculation from output voltages. The temperatures of the neighboring pixels in the surrounding area 504 of the selected pixels 502 are set to the same temperature as the selected pixel 502. This method is computationally simple, but not as accurate as more complex methods of interpolation.

Another method is bilinear interpolation where the temperature of the pixels are determined by linear interpolation in both x and y directions from the selected pixel. Therefore, the interpolation is continuous, as shown by the equation below.

$$T(x, y) = \binom{T(x_i, y_i)(x_{i+1} - x)(y_{i+1} - y) + T(x_{i+1}, y_i)(x - x_i)(y_{i+1} - y) +}{T(x_i, y_{i+1})(x_{i+1} - x)(y - y_i) + T(x_{i+1}, y_{i+1})(x - x_i)(y - y_i)} /$$

$$((x_{i+1} - x_i)(y_{i+1} - y_i))$$

Figure 5B:
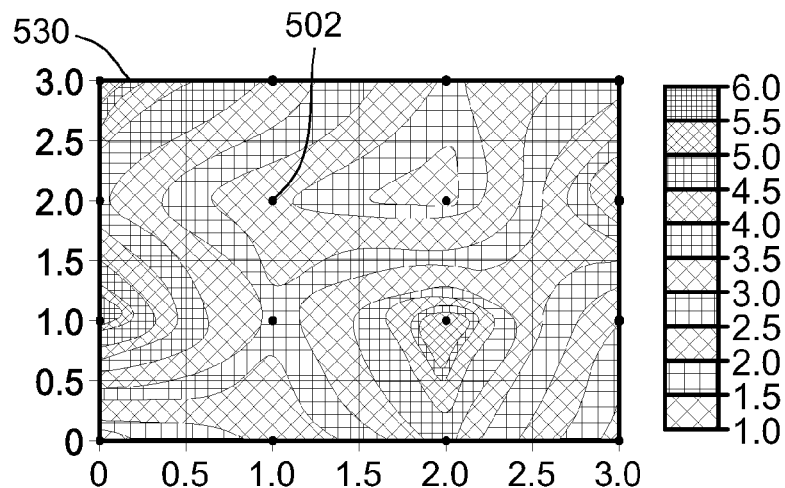

T (i, j) is the closest temperature measurement to the left-bottom of the pixel location (x,y). FIG. 5B shows a temperature graph that shows the resulting temperatures assigned to the pixels in the array based on the temperature data using bilinear interpolation from the temperature of the selected pixels. The selected pixels 502 result in a more accurate temperature distribution than the near neighbor method.

Figure 5C:
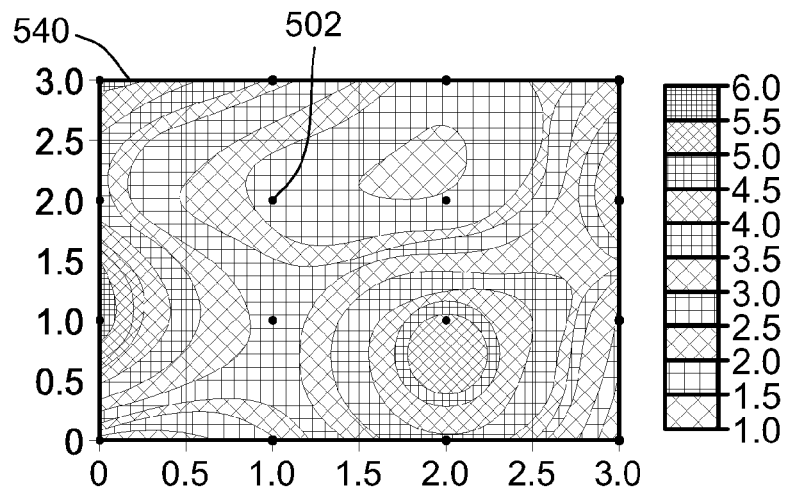

Another method is bicubic interpolation which results in smoother transitions than bilinear interpolation. The bicubic interpolation uses four corners around the selected pixel and their first order derivatives. The bicubic interpolation is up to first derivative continuous as shown in FIG. 5C which shows the estimated temperatures on pixels around the selected pixels 502.

The bicubic interpolation follows the equation $$T(x, y) = \sum_{m=0}^{3} \sum_{n=0}^{3} a_{mn}(x - x_i)^m (y - y_j)^n$$

Where $$\begin{bmatrix} a_{00} \\ a_{10} \\ a_{20} \\ a_{30} \\ a_{01} \\ a_{11} \\ a_{21} \\ a_{31} \\ a_{02} \\ a_{12} \\ a_{22} \\ a_{32} \\ a_{03} \\ a_{13} \\ a_{23} \\ a_{33} \end{bmatrix} = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ -3 & 3 & 0 & 0 & -2 & -1 & 0 & 0 & 0 & 0 & 0 & 0 & 0 & 0 & 0 & 0 \\ 2 & -2 & 0 & 0 & 1 & 1 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & -3 & 3 & 0 & 0 & -2 & -1 & 0 & 0 \\ 0 & 0 & 0 & 0 & 0 & 0 & 0 & 0 & 2 & -2 & 0 & 0 & 1 & 1 & 0 & 0 \\ -3 & 0 & 3 & 0 & 0 & 0 & 0 & 0 & -2 & 0 & -1 & 0 & 0 & 0 & 0 & 0 \\ 0 & 0 & 0 & 0 & -3 & 0 & 3 & 0 & 0 & 0 & 0 & 0 & 2 & 0 & -1 & 0 \\ 9 & -9 & -9 & 9 & 6 & 3 & -6 & -3 & 6 & -6 & 3 & -3 & 4 & 2 & 2 & 1 \\ -6 & 6 & 6 & -6 & -3 & -3 & 3 & 3 & -4 & 4 & -2 & 2 & -2 & -2 & -1 & -1 \\ 2 & 0 & -2 & 0 & 0 & 0 & 0 & 0 & 1 & 0 & 1 & 0 & 0 & 0 & 0 & 0 \\ 0 & 0 & 0 & 0 & 2 & 0 & -2 & 0 & 0 & 0 & 0 & 0 & 1 & 0 & 1 & 0 \\ -6 & 6 & 6 & -6 & -4 & -2 & 4 & 2 & -3 & 3 & -3 & 3 & -2 & -1 & -2 & -1 \\ 4 & -4 & -4 & 4 & 2 & 2 & -2 & -2 & 2 & -2 & 2 & -2 & 1 & 1 & 1 & 1 \end{bmatrix} \times \begin{bmatrix} T(x_i, y_i) \\ T(x_{i+1}, y_i) \\ T(x_i, y_{i+1}) \\ T(x_{i+1}, y_{i+1}) \\ T_x(x_i, y_i) \\ T_x(x_{i+1}, y_i) \\ T_x(x_i, y_{i+1}) \\ T_x(x_{i+1}, y_{i+1}) \\ T_y(x_i, y_i) \\ T_y(x_{i+1}, y_i) \\ T_y(x_i, y_{i+1}) \\ T_y(x_{i+1}, y_{i+1}) \\ T_{xy}(x_i, y_i) \\ T_{xy}(x_{i+1}, y_i) \\ T_{xy}(x_i, y_{i+1}) \\ T_{xy}(x_{i+1}, y_{i+1}) \end{bmatrix}$$

The x and y subscripts indicate the derivative of temperature in x and y directions. These derivatives may be calculated from the measurements from the selected pixels, using the finite difference method. For example, $$T_x(x_i, y_i) = \frac{T(x_{i+1}, y_i) - T(x_{i+1}, y_i)}{2d_x}$$

Where $d_x$ is the x-distance between two adjacent selected pixels with thermal sensors or selected pixels with voltage readings.

Another method is Kriging (Wiener-Kolmogorov Prediction) which is a least square estimation method that interpolates the temperature of each pixel as a linear weighted sum of all temperature measurements, as follows:

$$T(z^*) = \sum_{i=1}^{n} \lambda_i(z^*)T(z_i)$$

In this equation, $T(z^*)$ is the temperature of the pixel of interest, $T(z_i)$ are measured temperatures by n sensors or derived from the voltage output of selected n pixels. $\lambda_i(z^*)$ are the coefficients of Kriging. The assumption of Kriging is that the random field is spatially correlated. This is a valid assumption for temperature profile as the temperature is a low pass filtered 2-D signal of power consumption in space domain. The low pass filtering removes the high frequency harmonies and leave the thermal profile with low frequency harmonies leading to high correlation among close pixels. The closer the pixels are, the higher is the correlation.

The Kriging coefficients may be calculated using the variogram of temperature. The variogram between two points $z_1$ and $z_2$ is defined as $$\gamma(z_1, z_2) = E[(T(z_1) - T(z_2))^2] \begin{bmatrix} \lambda_1(z^*) \\ \vdots \\ \lambda_n(z^*) \\ \mu \end{bmatrix} =$$

$$\begin{bmatrix} \gamma(z_1, z_1) & \cdots & \gamma(z_1, z_n) & 1 \\ \vdots & \ddots & \vdots & \vdots \\ \gamma(z_n, z_1) & \cdots & \gamma(z_n, z_n) & 1 \\ 1 & \cdots & 1 & 0 \end{bmatrix}^{-1} \times \begin{bmatrix} \gamma(z_1, z^*) \\ \vdots \\ \gamma(z_n, z^*) \\ 1 \end{bmatrix}$$

The Kriging coefficients may be pre-calculated and stored in memory coupled to the controller 112 to reduce the interpolation computation cost to evaluation of an additive equation as explained above.

Whether a very simple interpolation method such as bilinear or a very complex one such as bicubic is used, the required computation increases for a full panel display with millions of pixels. However, the temperature profile has a large time-constant and therefore the thermal profile of panel may be updated progressively as the video is processed.

An alternative method of determining the temperature profile of the pixels calculates the thermal profile from the video data from the AMOLED display system 100. The temperature profile is obtained via video data from the AMOLED display system 100 as follows. The heat conduction and temperature are governed by the following heat diffusion equation:

$$\rho c_p \frac{\partial T(x, y, z, t)}{\partial t} - \nabla \cdot (k(x, y, z, T) \nabla T(x, y, z, t)) = P(x, y, z, t) \quad (1)$$

with two boundary conditions depending on the packaging material and surrounding environment. For the insulated condition:

$$\frac{\partial T(x, y, z, t)}{\partial \eta_i} = 0 \quad (2)$$

and for the convective condition $$k(x, y, z, T) \frac{\partial T(x, y, z, t)}{\partial \eta_t} = h(T(x, y, z, t) - T_a) \quad (3)$$

Where T is the temperature in Celsius, P is the power density in Watts per meters$^3$, k is the thermal conductivity W° C./m$^3$ $\rho$ is the density of the material (kg/meters$^3$), $c_p$ is the specific heat $$\frac{J}{(Kg \cdot ° C.)},$$

$h_i$ is the convective heat transfer coefficient, and $n_i$ is the outward direction normal to the surface of i.

Figure 6:
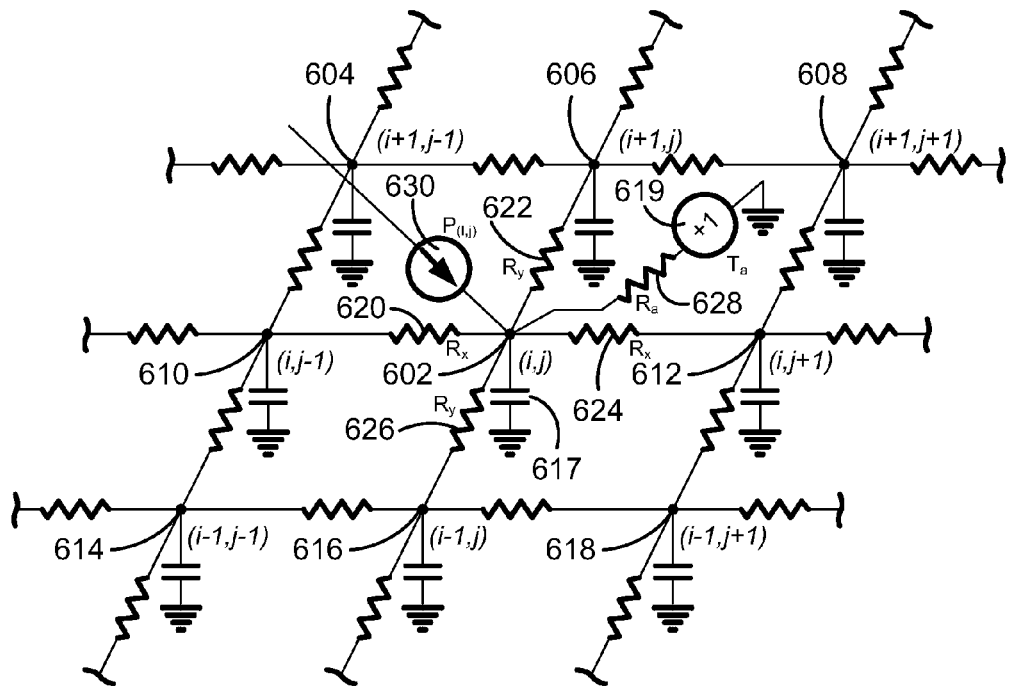
FIG. 6 is an equivalent circuit model for another method of thermal compensation for the AMOLED display in FIG. 1.

By using the finite difference method (FDM), the partial differential equation of (1) may be reduced to an equivalent circuit analysis problem and solved numerically by the model circuit 600 in FIG. 6. In such a model, capacitances and resistances are used to model material specific heat, density, conduction, and environment convection. The power consumption and temperature are also modeled by current sources and nodal voltages. In this manner the thermal effect may be calculated from video data. The video data determines the power consumption of each pixel, therefore, by solving the equivalent circuit of FIG. 6, the thermal profile which is equivalent to nodal voltage profile is calculated. The calculation may be performed by the controller 112 in FIG. 1, but other hardware and/or software may perform the computations such as a video processor or a digital signal processor on a device coupled to the display system 100.

The thermal-model equivalent electrical circuit 600 of a pixel (i, j) such as the pixel node 602 surrounded by 8 neighboring pixel nodes 604, 606, 608, 610, 612, 614, 616 and 618 is shown in FIG. 6. Each node 602, 604, 606, 608, 610, 612, 614, 616 and 618 thus represents a pixel. The node 602 has a series of resistors 620, 622, 624 and 626 each of which represent the model of thermal components from other nodes 610, 606, 612 and 616, respectively representing other pixels around the pixel represented by the node 602.

It is assumed that each pixel such as the node 602 has width, length, and substrate thickness of w, l, t meters. Then, the temperature $T_a$ of the pixel (i,j) consuming power density of $P_{(ij)}$ is equivalent of the voltage of that node, if:

$$C = \rho c_p w l t \quad (4)$$

$$R_x = \frac{w}{klt}$$

$$R_y = \frac{l}{kwt}$$

$$R_a = \frac{1}{hwl}$$

In this example the $R_x$ value is expressed in resistors 620 and 624, $R_y$ is expressed in resistors 622 and 626, and $R_a$ is expressed in a resistor 628. The power density $P_{ij}$ is modeled as a power source 630. The temperature of the node $T_a$ is modeled as a voltage source 632 and is solved for by the electrical circuit model 600.

The circuit 600 in FIG. 6 is repeated in x and y directions of the array 102 in FIG. 1 until reaching the edges of the panel. If the edges are considered to be thermally insulated, the lateral resistances at the edge pixels to the outside are set to zero. The convection resistance ($R_a$) is temperature dependent.

Once such a model is produced, the thermal profile may be constructed for a video stream based on the power consumption characteristic of a pixel such as the pixel 104a in FIG. 1 in terms of displaying gray-level light intensity. However, the exact nodal analysis of such a large mesh with millions of electrical elements is impractical in real-time (60 image frames or more in a second). The thermal profile may be considered as a low pass filtered signal of the power consumption profile, both in time and space. The thermal conduction/convective resistance network is capable of eliminating and damping the thermal effect of locally high power consumption patterns and flattens the temperature profile. This may be counted as a low pass filtering of the power consumption profile in x-y space. The thermal capacitances are also responsible to damp the effect of temporal power consumption spikes and low pass filtering in time.

In a steady-state case (zero thermal capacitances or time-invariant power consumption profile), a 2-D system transformation function can be constructed to extract the steady-state thermal profile from a pixel. In that case, the 2-D Discrete Cosine Transformation (DCT) of the power consumption is multiplied with such a system transformation function. The output of such a transformation can then be inverse discrete cosine transformed to obtain the steady-state thermal profile. Such a 2-D system transformation function may be generated using the Green function-based solution of thermal equations. Moreover, in the transient case, the thermal behavior of each pixel can be approximated with a very low-order time-domain filer using a model order reduction technique for an integrated circuit.

Figure 7:
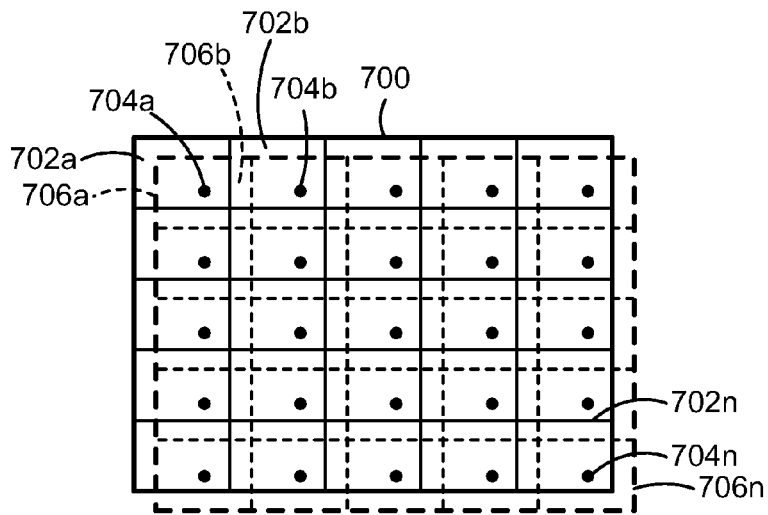
FIG. 7 is a diagram of a thermal sensor grid for one mechanism of thermal compensation for the AMOLED display in FIG. 1.

Since temperature profile is basically a low pass filtered of power consumption profile, in space and time domains the following algorithm may be used to significantly reduce the computational cost of the thermal profile extraction of OLED displays, to enable real-time thermal profile extraction by only performing the transformation for selected pixels in the display system 100. FIG. 7 is a graphic of the display 700 showing the process of dividing the display 700 and selecting certain pixels for thermal profile extraction from the power levels of pixels in the AMOLED display.

The array of pixels of the display 700 is divided to M×K squares 702a, 702b, to 702n as shown by the solid lines in FIG. 7. Each of the M×K squares contains N×N pixels. A pixel such as the pixel 704a is randomly selected from the square 702a of N×N pixels. Pixels 704b . . . 704n with the same local location within the grid squares M×K 702b . . . 702n as the pixel 704a are selected as shown by the solid points 704b . . . 702n in FIG. 7. A set of new N×N pixel squares 706a, 706b . . . 706n are created such that each selected pixel 704 is placed in the middle of each new square 706a, 706b . . . 706n. The new squares 706a, 706b . . . 706n are shown by dashed lines in FIG. 7. A new frame is then fetched and the power consumption of each selected pixel 704a-704n is calculated.

The power consumption of all pixels in each dashed-line square 706a, 706b . . . 706n in FIG. 7 is assumed to be equal to the power consumption of the selected (middle) pixel 704a, 704b . . . 704n. Steady-state thermal analysis is performed for the assumed course-grain squares 706a, 706b . . . 706n in FIG. 7, by applying the low resolution DCT-based transformation. For example, if the 2-D transformation matrix of the display (obtained from green-function based analysis) is $F_{M \times K}$, and the power consumption is $P_{M \times K}$, then the steady-state temperature is:

$$T_s = IDCT(DCT(P_{M \times K}) * F_{M \times K}) + T_e$$

Where $T_e$ is the environment temperature, and '*' is element-wise multiplication of two matrices. DCT and IDCT are the discrete cosine transform and the inverse-DCT operations.

The full resolution steady-state temperature profile for the other pixels in the squares 706a-706n is constructed by nearest-neighbor, bilinear, or bicubic interpolation from the profiles of the selected pixels 704a-704n by the general process explained above. The steady-state (infinite-time) response is then used to calculate the temperature of each pixel, at the end of the current frame, by using the reduced-order time-domain (temporal) thermal model. For example, if the temporal model is a first-order model, the temperature at the end of current frame is:

$$T = T_o + (T_s - T_o)\left(1 - e^{-\frac{t_f}{\tau}}\right) \quad (6)$$

where $T_o$ is the temperature profile at the beginning of the frame and $t_f$ is the duration of the frame. The controller then loops back to randomly select another pixel within the grids 702a-702n in the array 700. A new set of squares is then centering on randomly selected pixel. In this manner, distortions due to localized temperatures may be minimized.

The above described methods of determining temperature of the pixels in the array may be performed by a processing device such as the 112 in FIG. 1 or another such device which may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein.

The operation of the example temperature determination methods may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible, non-transient media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the temperature determination methods could be implemented by software, hardware, and/or firmware. Also, some or all of the machine readable instructions represented may be implemented manually.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A semiconductor device, comprising:
a plurality of pixels each including a drive transistor and an organic light emitting device coupled to the drive transistor, each drive transistor having a gate, wherein the plurality of pixels are arranged in an array; and
a controller coupled to each of the plurality of pixels, the controller causing a programming voltage to be applied to the gate of the respective drive transistors to control the brightness of each pixel,
during a first time frame, the controller:
dividing the array into clusters of pixels, each cluster comprising a plurality of pixels,
selecting a first select pixel in each of the clusters,
reading data from each of the first select pixels to determine the temperature of the first select pixels,
estimating the temperature of the other non-first-select plurality of pixels based on the determined temperature of the first select pixels;
during a second time frame, the controller:
selecting a different second select pixel in each of the clusters,
reading data from each of the second select pixels to determine the temperature of the second select pixels,
estimating the temperature of the other non-second-select plurality of pixels based on the determined temperature of the second select pixels.

2. The device of claim 1 wherein the selecting a first select pixel in each of the clusters comprises the controller selecting a first select pixel in a first one of the clusters and then selecting first select pixels in the remaining clusters that have the same relative locations within the remaining clusters as the first select pixel has in the first one of the clusters and;
wherein the selecting a different second select pixel in each of the clusters comprises the controller selecting a second different select pixel in the first one of the clusters and then selecting second select pixels in the remaining clusters that have the same relative locations within the remaining clusters as the second select pixel has in the first one of the clusters.

3. The device of claim 2 wherein the first and second select pixels are randomly determined.

4. The device of claim 2 wherein during the first timeframe the controller divides the plurality of pixels into second clusters centered around the first selected pixels and wherein during the second timeframe the controller divides the plurality of pixels into third clusters centered around the second selected pixels.

5. The device of claim 4 wherein the first and second select pixels are randomly determined.

6. The device of claim 1 wherein the first and second select pixels are randomly determined.

7. The device of claim 1, wherein the estimating is performed by interpolating the determined temperatures to surrounding non-select pixels from the select pixels, the interpolation including one of nearest neighbor, bilinear, bicubic or Kriging.

8. The device of claim 1, wherein the number of first select pixels are less than the number of the non-first-select plurality of pixels and wherein the number of second select pixels are less than the number of the non-second-select plurality of pixels.

9. The device of claim 1, wherein the controller compensates the programming voltage to offset the effect of the determined or estimated temperatures on each of the plurality of pixels.

10. The device of claim 1, further comprising a thermal sensor in proximity to each selected pixel.

11. The device of claim 1, wherein each select pixel includes a drive transistor having a gate coupled to the programming voltage input, and wherein a calibration voltage produces an output voltage having a change in value used to derive the temperature of each select pixel.

12. A semiconductor device, comprising:
a plurality of pixels each including a drive transistor and an organic light emitting device coupled to the drive transistor, each drive transistor having a gate, wherein the plurality of pixels are arranged in an array; and
a controller coupled to each of the plurality of pixels, the controller causing a programming voltage to be applied to the gate of the respective drive transistors to control the brightness of each pixel,
the controller:
dividing the array into clusters of pixels, each cluster comprising a plurality of pixels,
selecting a first select pixel in each of the clusters,
reading data from each of the first select pixels to determine the temperature of the first select pixels,
estimating the temperature of the other non-first-select plurality of pixels based on the determined temperature of the first select pixels;
the controller:
selecting a different second select pixel in each of the clusters,
reading data from each of the second select pixels to determine the temperature of the second select pixels,
estimating the temperature of the other non-second-select plurality of pixels based on the determined temperature of the second select pixels.

13. The device of claim 12, wherein the temperature of each select pixel is determined by a finite difference model to reduce the differential equation of pixel power to an equivalent circuit, the equivalent circuit being based on the measured power and dimensions of the OLED to solve for a voltage equivalent model of the pixel temperature.

14. The device of claim 12, wherein the controller compensates the programming voltage to offset the effect of the determined or estimated temperatures on each of the plurality of pixels.

15. The method of claim 12, wherein the temperature of each select pixel determined by a finite difference model to reduce the differential equation of pixel power to an equivalent circuit, the equivalent circuit being based on the measured power and dimensions of the OLED to solve for a voltage equivalent model of the pixel temperature.

16. A method of determining the temperature profile of an active matrix organic light emitting device display including a controller and a plurality of organic light emitting device pixels arranged in an array, each pixel having a programming voltage input to determine brightness, the method comprising the acts of:
during a first timeframe, the controller:
dividing the array into clusters of pixels, each cluster comprising a plurality of pixels,
selecting a first select pixel in each of the clusters,
reading data from each of the first select pixels to determine the temperature of the first select pixels, estimating the temperature of the other non-first-select plurality of pixels based on the determined temperature of the first select pixels;

during a second timeframe, the controller:
selecting a different second select pixel in each of the clusters,
reading data from each of the second select pixels to determine the temperature of the second select pixels,
estimating the temperature of the other non-second-select plurality of pixels based on the determined temperature of the second select pixels.

17. The method of claim 16 wherein the selecting a first select pixel in each of the clusters comprises the controller selecting a first select pixel in a first one of the clusters and then selecting first select pixels in the remaining clusters that have the same relative locations within the remaining clusters as the first select pixel has in the first one of the clusters and;
wherein the selecting a different second select pixel in each of the clusters comprises the controller selecting a second different select pixel in the first one of the clusters and then selecting second select pixels in the remaining clusters that have the same relative locations within the remaining clusters as the second select pixel has in the first one of the clusters.

18. The method of claim 17 wherein the first and second select pixels are randomly determined.

19. The method of claim 17 further comprising during the first timeframe the controller dividing the plurality of pixels into second clusters centered around the first selected pixels and during the second timeframe the controller dividing the plurality of pixels into third clusters centered around the second selected pixels.

20. The method of claim 19 wherein the first and second select pixels are randomly determined.

21. The method of claim 16 wherein the first and second select pixels are randomly determined.

22. The method of claim 16, wherein the estimating is performed by interpolating the determined temperatures to surrounding non-select pixels from the select pixels, the interpolation including one of nearest neighbor, bilinear, bicubic or Kriging.

23. The method of claim 16, wherein the number of first select pixels are less than the number of the non-first-select plurality of pixels and wherein the number of second select pixels are less than the number of the non-second-select plurality of pixels.

24. The method of claim 16, further comprising compensating the programming voltage to offset the effect of the determined or estimated temperatures on each of the plurality of pixels.

25. The method of claim 16, wherein the temperature is determined by a thermal sensor in proximity to the one of the selected pixels.

26. The method of claim 16, wherein each select pixel includes a drive transistor having a gate coupled to the programming voltage input, and wherein a calibration voltage produces an output voltage having a change in value used to derive the temperature of each select pixel.

27. A method of determining the temperature profile of semiconductor device including a controller and a plurality of organic light emitting device pixels arranged in an array, each pixel having a programming voltage input to determine brightness, each pixel including a drive transistor and an organic light emitting device coupled to the drive transistor, each drive transistor having a gate, the method comprising the acts of the controller:
dividing the array into clusters of pixels, each cluster comprising a plurality of pixels,
selecting a first select pixel in each of the clusters,
reading data from each of the first select pixels to determine the temperature of the first select pixels,
estimating the temperature of the other non-first-select plurality of pixels based on the determined temperature of the first select pixels;
selecting a different second select pixel in each of the clusters,
reading data from each of the second select pixels to determine the temperature of the second select pixels,
estimating the temperature of the other non-second-select plurality of pixels based on the determined temperature of the second select pixels.

28. A non-transitory machine readable medium having stored thereon instructions for determining a temperature profile of an active matrix organic light emitting device display including a plurality of organic light emitting device pixels arrange in an array, each having a programming voltage input to determine brightness, comprising machine executable code which when executed by at least one machine, causes the machine to:
during a first timeframe:
divide the array into clusters of pixels, each cluster comprising a plurality of pixels,
select a first select pixel in each of the clusters,
read data from each of the first select pixels to determine the temperature of the first select pixels,
estimate the temperature of the other non-first-select plurality of pixels based on the determined temperature of the first select pixels;
during a second timeframe:
select a different second select pixel in each of the clusters,
read data from each of the second select pixels to determine the temperature of the second select pixels,
estimate the temperature of the other non-second-select plurality of pixels based on the determined temperature of the second select pixels.

29. The non-transitory machine readable medium of claim 28, wherein the estimation includes interpolating the determined temperatures to surrounding non-select pixels from the select pixels, the interpolation including one of nearest neighbor, bilinear, bicubic or Kriging.

30. The non-transitory machine readable medium of claim 28, wherein the temperature of each select pixel determined by a finite difference model to reduce the differential equation of pixel power to an equivalent circuit, the equivalent circuit being based on the measured power and dimensions of the OLED to solve for a voltage equivalent model of the pixel temperature.

31. The non-transitory machine readable medium of claim 28, wherein the machine executable code which when executed by at least one machine, causes the machine:
when selecting a first select pixel in each of the clusters to select a first select pixel in a first one of the clusters and then select first select pixels in the remaining clusters that have the same relative locations within the remaining clusters as the first select pixel has in the first one of the clusters;
when selecting a different second select pixel in each of the clusters to select a second different select pixel in the first one of the clusters and then select second select pixels in the remaining clusters that have the same relative locations within the remaining clusters as the second select pixel has in the first one of the clusters;

during the first timeframe to divide the plurality of pixels into second clusters centered around the first selected pixels; and during the second timeframe to divide the plurality of pixels into third clusters centered around the second selected pixels.

* * * * *